US012002479B2

(12) United States Patent
Xiao et al.

(10) Patent No.: US 12,002,479 B2
(45) **Date of Patent: *Jun. 4, 2024**

(54) BANDWIDTH EXTENSION METHOD AND APPARATUS, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Wei Xiao, Shenzhen (CN); Xiaoming Huang, Shenzhen (CN); Jiajun Chen, Shenzhen (CN); Yannan Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 256 days.

This patent is subject to a terminal disclaimer.

(21) Appl. No.: 17/511,537

(22) Filed: Oct. 26, 2021

(65) Prior Publication Data

US 2022/0068285 A1 Mar. 3, 2022

Related U.S. Application Data

(63) Continuation of application No. PCT/CN2020/115010, filed on Sep. 14, 2020.

(30) Foreign Application Priority Data

Sep. 18, 2019 (CN) ......................... 201910883374.5

(51) Int. Cl.
*G10L 19/02* (2013.01)
*G10L 21/02* (2013.01)
(Continued)

(52) U.S. Cl.
CPC .......... *G10L 19/0204* (2013.01); *G10L 21/02* (2013.01); *G10L 21/0388* (2013.01);
(Continued)

(58) Field of Classification Search
CPC ... G10L 21/038; G10L 21/0388; G10L 21/02; G10L 25/30
See application file for complete search history.

(56) References Cited

U.S. PATENT DOCUMENTS

| | | | |
|---|---|---|---|
| 9,064,498 | B2 | 6/2015 | Uhle et al. |
| 11,562,764 | B2 | 1/2023 | Schmidt et al. |

(Continued)

FOREIGN PATENT DOCUMENTS

| | | | |
|---|---|---|---|
| CN | 1520590 | A | 8/2004 |
| CN | 101458930 | A | 6/2009 |

(Continued)

OTHER PUBLICATIONS

Li et al., "A deep neural network approach to speech bandwidth expansion." 2015 IEEE International Conference on Acoustics, Speech and Signal Processing (ICASSP). IEEE (Year: 2015).*

(Continued)

*Primary Examiner* — Samuel G Neway
(74) *Attorney, Agent, or Firm* — ANOVA LAW GROUP, PLLC

(57) ABSTRACT

A bandwidth extension (BWE) method includes: determining parameters of a low-frequency spectrum of a narrowband signal; inputting the parameters of the low-frequency spectrum into a neural network model, and obtaining a correlation parameter based on an output of the neural network model; obtaining a target high-frequency amplitude spectrum based on the correlation parameter and a low-frequency amplitude spectrum; obtaining a high-frequency spectrum based on a low-frequency phase spectrum and the (Continued)

target high-frequency amplitude spectrum of the narrowband signal; and obtaining a broadband signal after BWE based on the low-frequency spectrum and the high-frequency spectrum.

18 Claims, 4 Drawing Sheets

(51) Int. Cl.

| | |
|---|---|
| ***G10L 21/0388*** | (2013.01) |
| ***G10L 25/06*** | (2013.01) |
| ***G10L 25/18*** | (2013.01) |
| ***G10L 25/30*** | (2013.01) |

(52) U.S. Cl.

CPC .............. *G10L 25/06* (2013.01); *G10L 25/18* (2013.01); *G10L 25/30* (2013.01)

(56) References Cited

U.S. PATENT DOCUMENTS

| | | | | |
|---|---|---|---|---|
| 2004/0166820 | A1 | 8/2004 | Sluijter et al. | |
| 2013/0144614 | A1 | 6/2013 | Myllyla et al. | |
| 2017/0162194 | A1 | 6/2017 | Nesta et al. | |
| 2018/0040336 | A1* | 2/2018 | Wu | G10L 19/26 |
| 2021/0166705 | A1 | 6/2021 | Chang et al. | |
| 2021/0407526 | A1* | 12/2021 | Xiao | G10L 19/0212 |
| 2022/0068285 | A1* | 3/2022 | Xiao | G10L 19/0204 |

FOREIGN PATENT DOCUMENTS

| | | | | | |
|---|---|---|---|---|---|
| CN | 102124518 | A | | 7/2011 | |
| CN | 103026407 | A | | 4/2013 | |
| CN | 107705801 | A | | 2/2018 | |
| CN | 107705801 | A | * | 2/2018 | G10L 21/038 |
| CN | 107993672 | A | | 5/2018 | |
| CN | 107993672 | A | * | 5/2018 | G10L 21/038 |
| CN | 108198571 | A | | 6/2018 | |
| CN | 109599123 | A | | 4/2019 | |
| CN | 110556122 | A | | 12/2019 | |
| CN | 110556123 | A | | 12/2019 | |
| JP | H08278800 | A | | 10/1996 | |
| JP | 2004521394 | A | | 7/2004 | |
| JP | 2021502588 | A | | 1/2021 | |
| WO | 03003350 | A1 | | 1/2003 | |
| WO | 2009076871 | A1 | | 6/2009 | |
| WO | 2010048827 | A1 | | 5/2010 | |
| WO | 2019004592 | A1 | | 1/2019 | |
| WO | 2019081070 | A1 | | 5/2019 | |

OTHER PUBLICATIONS

The World Intellectual Property Organization (WIPO) International Search Report for PCT/CN2020/115010 dated Dec. 17, 2020 8 Pages (including translation).

A. C. Den Brinker et al., "An Overview of the Coding Standard MPEG-4 Audio Amendments 1 and 2: HE-AAC, SSC, and HE-AAC v2," In EURASIP Journal on Audio, Speech, and Music Processing, 2009. 21 pages.

J. Abel et al., "Enhancing the EVS Codec in Wideband Mode by Blind Artificial Bandwidth Extension to Superwideband," In iWAENC, Sep. 2018. 5 pages.

China National Intellectual Property Administration (CNIPA) Office Action 1 for 201910883374.5 dated Aug. 2, 2023 12 Pages (including translation).

The Japan Patent Office (JPO) Decision to Grant a Patent for Application No. 2021-558881 and Translation dated May 1, 2023 5 Pages.

Kehuang et al., "A deep neural network approach to speech bandwidth expansion", IEEE International Conference on Acoustics, Speech and Signal Processing, Apr. 19, 2015, p. 4395-4399.

The Japan Patent Office (JPO) Notice of Reasons for Refusal for Application No. 2021-558881 and Translation dated Oct. 24, 2022 6 Pages.

* cited by examiner

BANDWIDTH EXTENSION METHOD AND APPARATUS, ELECTRONIC DEVICE, AND COMPUTER-READABLE STORAGE MEDIUM

CROSS-REFERENCES TO RELATED APPLICATIONS

This application is a continuation application of PCT Patent Application No. PCT/CN2020/115010, entitled "FREQUENCY BAND EXPANSION METHOD AND APPARATUS, ELECTRONIC DEVICE, AND COMPUTER READABLE STORAGE MEDIUM" and filed on Sep. 14, 2020, which claims priority to Chinese Patent Application No. 201910883374.5, entitled "BANDWIDTH EXTENSION METHOD AND APPARATUS, ELECTRONIC DEVICE, AND COMPUTER-READABLE STORAGE MEDIUM" filed with the China National Intellectual Property Administration on Sep. 18, 2019, the entire contents of both of which are incorporated herein by reference.

FIELD OF THE TECHNOLOGY

The present disclosure relates to the field of audio signal processing technologies, and specifically, to a bandwidth extension (BWE) method and apparatus, an electronic device, and a computer-readable storage medium.

BACKGROUND OF THE DISCLOSURE

BWE, also referred to as spectral band replication, is a classic technology in the field of audio encoding. A BWE technology is a parameter encoding technology. Based on BWE, an effective bandwidth can be extended on a receive end, to improve quality of an audio signal, thereby enabling a user to intuitively feel a more sonorous timbre, a higher volume, and better intelligibility.

In the related art, a classic method for implementing BWE is to use a correlation between a high frequency and a low frequency in a speech signal to perform BWE. In an audio encoding system, the correlation is used as side information. On an encoder side, the side information is combined into a bitstream and transmitted; and on a decoder side, a low-frequency spectrum is sequentially restored through decoding, and a BWE operation is performed to restore a high-frequency spectrum. However, the method requires the system to consume corresponding bits (for example, based on encoding of information of a low-frequency part, 10% of bits are additionally used to encode the side information), that is, additional bits are required for encoding, and there is a forward compatibility problem.

Another common BWE method is a blind solution based on data analysis. The solution is based on a neural network or deep learning, in which a low-frequency coefficient is inputted and a high-frequency coefficient is outputted. Such a coefficient-coefficient mapping manner requires a high generalization capability of a network. To ensure effects, the network has a relatively large depth, a relatively large volume, and high complexity. In an actual process, performance of the method is mediocre in scenarios beyond modes included in a training library.

SUMMARY

A main objective of embodiments of the present disclosure is to provide a BWE method and apparatus, an electronic device, and a computer-readable storage medium, to overcome at least one technical defect existing in the related art, thereby better satisfying actual application requirements. Technical solutions provided in the embodiments of the present disclosure are as follows:

According to a first aspect, an embodiment of the present disclosure provides a BWE method, performed by an electronic device, the method including: determining parameters of a low-frequency spectrum of a narrowband signal; inputting the parameters of the low-frequency spectrum into a neural network model, and obtaining a correlation parameter based on an output of the neural network model; obtaining a target high-frequency amplitude spectrum based on the correlation parameter and a low-frequency amplitude spectrum; obtaining a high-frequency spectrum based on a low-frequency phase spectrum and the target high-frequency amplitude spectrum of the narrowband signal; and obtaining a broadband signal after BWE based on the low-frequency spectrum and the high-frequency spectrum.

According to a second aspect, the present disclosure provides a BWE apparatus, including: a low-frequency spectrum parameter determining module, configured to determine parameters of a low-frequency spectrum of a narrowband signal, the parameters of the low-frequency spectrum including a low-frequency amplitude spectrum; a correlation parameter determining module, configured to: input the parameters of the low-frequency spectrum into a neural network model, and obtain a correlation parameter based on an output of the neural network model, the correlation parameter representing a correlation between a high-frequency part and a low-frequency part of a target broadband spectrum and including a high-frequency spectrum envelope; a high-frequency amplitude spectrum determining module, configured to obtain a target high-frequency amplitude spectrum based on the correlation parameter and the low-frequency amplitude spectrum; a high-frequency phase spectrum generation module, configured to generate a corresponding high-frequency phase spectrum based on a low-frequency phase spectrum of the narrowband signal; a high-frequency spectrum determining module, configured to obtain a high-frequency spectrum according to the target high-frequency amplitude spectrum and the high-frequency phase spectrum; and a broadband signal determining module, configured to obtain a broadband signal after BWE based on a low-frequency spectrum and the high-frequency spectrum.

According to a third aspect, an embodiment of the present disclosure provides an electronic device, including a processor and a memory, the memory storing computer-readable instructions. The computer-readable instructions, when loaded and executed by the processor, cause the processor to perform: determining parameters of a low-frequency spectrum of a narrowband signal; inputting the parameters of the low-frequency spectrum into a neural network model, and obtaining a correlation parameter based on an output of the neural network model; obtaining a target high-frequency amplitude spectrum based on the correlation parameter and a low-frequency amplitude spectrum; obtaining a high-frequency spectrum based on a low-frequency phase spectrum and the target high-frequency amplitude spectrum of the narrowband signal; and obtaining a broadband signal after BWE based on the low-frequency spectrum and the high-frequency spectrum.

According to a fourth aspect, an embodiment of the present disclosure provides a non-transitory computer-readable storage medium, storing computer-readable instructions, the computer-readable instructions, when loaded and executed by a processor, implementing: determining parameters of a low-frequency spectrum of a narrowband signal; inputting the parameters of the low-frequency spectrum into a neural network model, and obtaining a correlation parameter based on an output of the neural network model; obtaining a target high-frequency amplitude spectrum based on the correlation parameter and a low-frequency amplitude spectrum; obtaining a high-frequency spectrum based on a low-frequency phase spectrum and the target high-frequency amplitude spectrum of the narrowband signal; and obtaining a broadband signal after BWE based on the low-frequency spectrum and the high-frequency spectrum.

BRIEF DESCRIPTION OF THE DRAWINGS

To describe the technical solutions in the embodiments of the present disclosure more clearly, the following briefly describes the accompanying drawings required for describing the embodiments of the present disclosure.

DESCRIPTION OF EMBODIMENTS

Figure 1A:
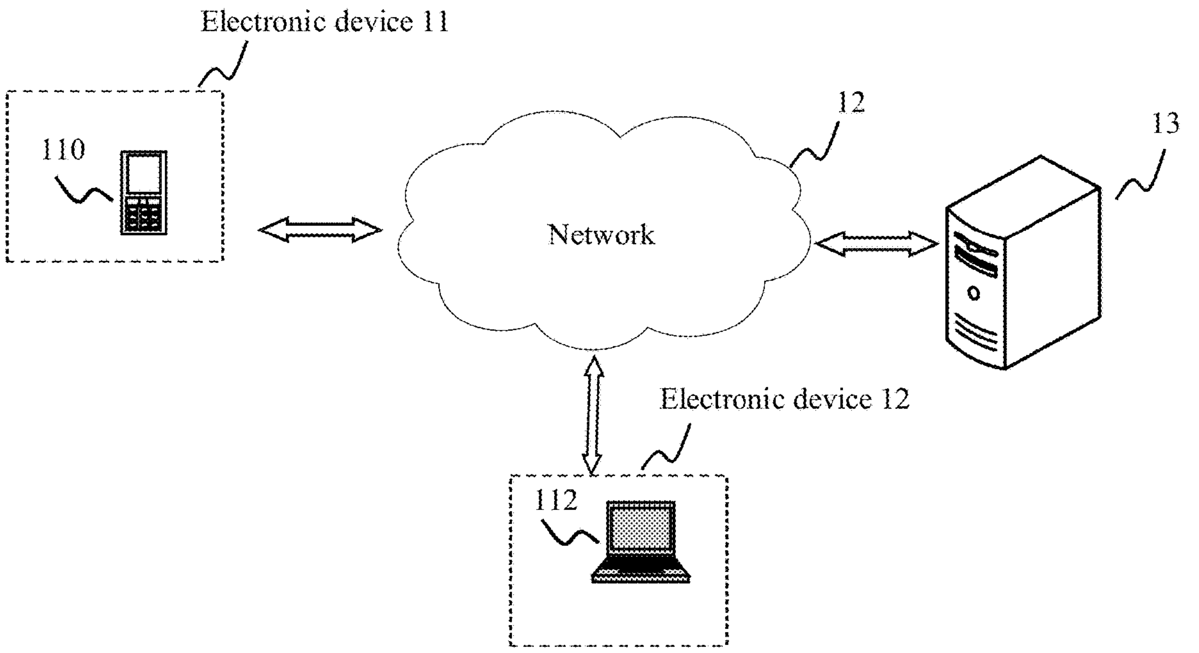
FIG. 1A is a diagram of a scenario of a BWE method according to an embodiment of the present disclosure.

To make the objectives, features, and advantages of the present disclosure clearer and more comprehensible, the following clearly and completely describes the technical solutions in the embodiments of the present disclosure with reference to the accompanying drawings in the embodiments of the present disclosure. Apparently, the embodiments described below are merely some rather than all of the embodiments of the present disclosure. All other embodiments obtained by a person of ordinary skill in the art based on the embodiments of the present disclosure without creative efforts shall fall within the protection scope of the present disclosure.

Embodiments of the present disclosure are described in detail below, and examples of the embodiments are shown in accompanying drawings, where the same or similar elements or the elements having same or similar functions are denoted by the same or similar reference numerals throughout the description. The embodiments that are described below with reference to the accompanying drawings are exemplary, and are only used to interpret the present disclosure and cannot be construed as a limitation to the present disclosure.

A person skilled in the art may understand that, the singular forms “a”, “an”, “said”, and “the” used herein may include the plural forms as well, unless the context clearly indicates otherwise. It is to be further understood that, the terms “include” and/or “include” used in this specification of the present disclosure refer to the presence of stated features, integers, steps, operations, elements, and/or components, but do not preclude the presence or addition of one or more other features, integers, steps, operations, elements, components, and/or combinations thereof. It is to be understood that, when an element is “connected” or “coupled” to another element, the element may be directly connected to or coupled to another element, or an intermediate element may exist. In addition, the “connection” or “coupling” used herein may include a wireless connection or a wireless coupling. The term “and/or” used herein includes all of or any of units and all combinations of one or more related listed items.

To better understand and describe the solutions in the embodiments of the present disclosure, the following briefly describes some technical terms involved in the embodiments of the present disclosure.

Bandwidth extension (BWE): BWE is a technology of extending a narrowband signal into a broadband signal in the field of audio encoding.

Spectrum: Spectrum is an abbreviation of frequency spectrum density, and is a distribution curve of frequency.

Spectrum envelope (SE): SE is an energy representation of spectrum coefficients corresponding to a signal on a frequency axis corresponding to signals, and for a subband, is an energy representation of spectrum coefficients corresponding to the subband, for example, average energy of the spectrum coefficients corresponding to the subband.

Spectrum flatness (SF): SF represents a degree of power flatness of a to-be-measured signal in a channel in which the to-be-measured signal is located.

Neural network (NN): NN is an algorithm mathematical model for performing distributed and parallel information processing by imitating behavioral characteristics of animal neural networks. Such a network relies on complexity of a system, and achieves information processing by adjusting interconnection relationships between a large quantity of internal nodes.

Deep learning (DL): DL is one type of machine learning and forms a more abstract high-level representation attribute category or feature by combining low-level features, so as to discover distributed feature representations of data.

Public Switched Telephone Network (PSTN): PSTN is a common old telephone system, that is, a telephone network commonly used in our daily lives.

Voice over Internet Protocol (VoIP): VoIP is a voice call technology, and implements voice calls and multimedia conferences by using the Internet Protocol, that is, performs communication through the Internet.

3rd Generation Partnership Project (3GPP) Enhanced Voice Services (EVS): 3GPP is mainly to formulate third-generation technical specifications of a radio interface based on the Global System for Mobile Communications; and an EVS encoder is a new-generation speech/audio encoder, which not only can provide high audio quality for speech and music signals, but also has strong capabilities to resist a frame loss and a delay jitter, thereby bringing a brand new experience for users.

Internet Engineering Task Force (IETF) Opus: Opus is a lossy sound encoding format developed by the IETF.

SILK: A silk audio encoder achieves that the Internet-phone Skype provides a Silk broadband of royalty-free authentication to third-party developers and hardware manufacturers.

BWE is a classic technology in the field of audio encoding, and it may be learned from the foregoing descriptions that in the related art, the BWE may be implemented in the following manners:

First manner: For a narrowband signal with a low sampling rate, a spectrum of a low-frequency part in the narrowband signal is selected and replicated to a high-frequency part; and the narrowband signal is extended into a broadband signal according to side information (information used for describing an energy correlation between a high frequency and a low frequency) recorded in advance.

Second manner: Blind BWE, as the name implies, is directly completed without using additional bits. For a narrowband signal with a low sampling rate, technologies, such as a neural network or deep learning, are used. In the neural network or deep learning, a low-frequency spectrum of the narrowband signal is inputted, and a high-frequency spectrum is outputted. The narrowband signal is extended into a broadband signal based on the high-frequency spectrum.

However, if BWE is performed in the first manner, side information therein needs to consume corresponding bots, and there is a forward compatibility problem. For example, a typical scenario is a PSTN (narrowband voice) and VoIP (broadband voice) interworking scenario. In a PSTN to VoIP (PSTN-VoIP for short) transmission direction, broadband voice in the PSTN-VoIP transmission direction cannot be outputted without modifying a transmission protocol (adding a corresponding BWE bitstream). If BWE is performed in the second manner, a low-frequency spectrum is inputted, and a high-frequency spectrum is outputted. In this manner, no additional bits need to be consumed, but a high generalization capability of a network is required. To ensure accuracy of a network output, the network has a relatively large depth, a relatively large volume, and relatively high complexity, and consequently has relatively poor performance. Therefore, neither of the foregoing two BWE manners can satisfy a performance requirement of actual BWE.

In view of the problems in the related art, and to better satisfy actual application requirements, embodiments of the present disclosure provide a BWE method. This method not only requires no additional bits, but also can reduce the depth and the volume of the network and lower the network complexity.

In the embodiments of the present disclosure, the solutions of the present disclosure are described by using a speech scenario of PSTN and VoIP interworking as an example. That is, narrowband voice is extended into broadband voice in a PSTN-VoIP transmission direction. In an actual application, the present disclosure is not limited to the foregoing application scenario, and is also applicable to other encoding systems, which include, but are not limited to: mainstream audio encoders such as a 3GPP EVS encoder, an IETF Opus encoder, and a SILK encoder.

The following describes the technical solutions of the present disclosure and how to resolve the foregoing technical problems according to the technical solutions of the present disclosure in detail by using specific embodiments. The following several specific embodiments may be combined with each other, and the same or similar concepts or processes may not be described repeatedly in some embodiments. The following describes the embodiments of the present disclosure with reference to the accompanying drawings.

In the following process of describing the solutions of the present disclosure by using a speech scenario of PSTN and VoIP interworking as an example, a sampling rate is 8000 Hz, and a frame length of one speech frame is 10 ms (which is equivalent to 80 sample points/frame). In an actual application, considering that a frame length of a PSTN frame is 20 ms, only two operations need to be performed for each PSTN frame.

In the description process of the embodiments of the present disclosure, an example in which a data frame length is fixed to 10 ms is used. However, it is clear to a person skilled in the art that, the present disclosure is also applicable to a scenario in which the frame length is another value, for example, a scenario in which the frame length is 20 ms (which is equivalent to 160 sample points/frame). This is not limited in the present disclosure. Similarly, the example, in which the sampling rate is 8000 Hz, used in the embodiments of the present disclosure is not intended to limit an action range of BWE provided in the embodiments of the present disclosure. For example, although in a main embodiment of the present disclosure, a signal with a sampling rate of 8000 Hz is extended into a signal with a sampling rate of 16000 Hz through BWE, the present disclosure may alternatively be applicable to scenarios with other sampling rates, for example, extending a signal with a sampling rate of 16000 Hz into a signal with a sampling rate of 32000 Hz, and extending a signal with a sampling rate of 8000 Hz into a signal with a sampling rate of 12000 Hz. The solutions in the embodiments of the present disclosure may be applied to any scenario in which BWE needs to be performed on a signal.

FIG. 1A is a diagram of an application scenario of a BWE method according to an embodiment of the present disclosure. As shown in FIG. 1A, an electronic device may include a mobile phone 110 or a notebook computer 112, but is not limited thereto. An example in which the electronic device is the mobile phone 110 is used, and the remaining conditions are similar. The mobile device 110 communicates with a server device 13 through a network 12. In the example, the server device 13 includes a neural network model. The mobile phone 110 inputs a narrowband signal into the neural network model on the server device 13, obtains a broadband signal after BWE by using the method shown in FIG. 1B, and outputs the signal after BWE.

Although in the example in FIG. 1A, the neural network model is located on the server device 13, in another implementation, the neural network model may be located on the electronic device (not shown in the figure).

Figure 1B:
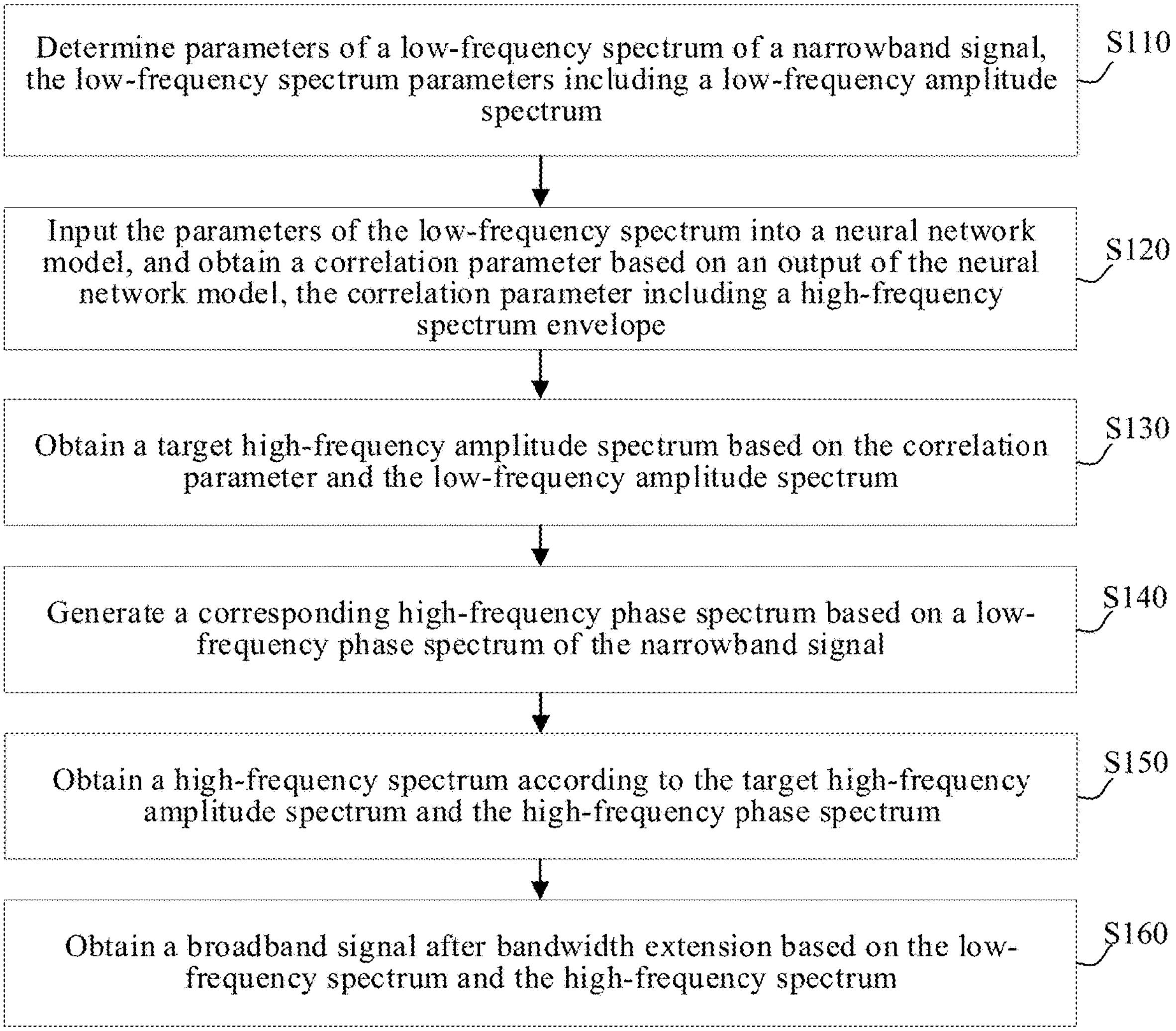
FIG. 1B is a schematic flowchart of a BWE method according to an embodiment of the present disclosure.

FIG. 1B is a schematic flowchart of a BWE method according to the present disclosure. As shown in the figure, the method may be performed by an electronic device shown in FIG. 5, and includes steps S110 to S160.

Step S110: Determine parameters of a low-frequency spectrum of a narrowband signal, the parameters of the low-frequency spectrum including a low-frequency amplitude spectrum.

The narrowband signal may be a speech frame signal requires BWE. For example, in a PSTN-VoIP channel, if a PSTN narrowband speech signal needs to be extended into a VoIP broadband speech signal, the narrowband signal may be the PSTN narrowband speech signal. If the narrowband signal is a speech frame, the narrowband signal may be all or some of speech signals of one speech frame.

Specifically, in an actual application scenario, for a to-be-processed signal, the signal may be used as a narrowband signal for completing BWE at a time, or the signal may be divided into a plurality of sub-signals, and the plurality of sub-signals are separately processed. For example, a frame length of the PSTN frame is 20 ms, and BWE may be performed on a signal of the speech frame of 20 ms once; or the speech frame of 20 ms may be divided into two speech frames of 10 ms, and BWE is separately performed on the two speech frames of 10 ms.

Step S120: Input the parameters of the low-frequency spectrum into a neural network model, and obtain a correlation parameter based on an output of the neural network model, the correlation parameter representing a correlation between a high-frequency part and a low-frequency part of a target broadband spectrum and including a high-frequency spectrum envelope.

The neural network model may be a model trained or pre-trained based on parameters of a low-frequency spectrum of a sample signal. The model is configured to predict a correlation parameter of the signal. The target broadband spectrum is a spectrum corresponding to a broadband signal (target broadband signal) into which the narrowband signal is to be extended. The target broadband spectrum may be obtained based on a low-frequency spectrum of the narrowband signal. For example, the target broadband spectrum may be obtained by replicating the low-frequency spectrum of the narrowband signal.

Step S130: Obtain a target high-frequency amplitude spectrum based on the correlation parameter and the low-frequency amplitude spectrum.

Because the correlation parameter can represent the correlation between the high-frequency part and the low-frequency part of the target broadband spectrum, target high-frequency spectrum parameters (that is, parameters corresponding to the high-frequency part) of a broadband signal into which the narrowband signal needs to be extended can be predicted based on the correlation parameter and the low-frequency amplitude spectrum (parameters corresponding to the low-frequency part).

Step S140: Generate a corresponding high-frequency phase spectrum based on a low-frequency phase spectrum of the narrowband signal.

A manner of generating a corresponding high-frequency phase spectrum based on a low-frequency phase spectrum is not limited in this embodiment of the present disclosure, and may include, but is not limited to, any one of the following manners:

First manner: A corresponding high-frequency phase spectrum is obtained by replicating the low-frequency phase spectrum.

Second manner: The low-frequency phase spectrum is flipped, and a phase spectrum the same as the low-frequency phase spectrum is obtained after the flipping. The two low-frequency phase spectra are mapped to corresponding high-frequency points, to obtain a corresponding high-frequency phase spectrum.

Step 150: Obtain a high-frequency spectrum according to the target high-frequency amplitude spectrum and the high-frequency phase spectrum.

Step 160: Obtain a broadband signal after BWE based on a low-frequency spectrum and the high-frequency spectrum.

After the high-frequency spectrum is obtained according to the high-frequency amplitude spectrum and the high-frequency phase spectrum, the low-frequency spectrum and the high-frequency spectrum can be combined, and a time-frequency inverse transform, that is, a frequency-time transform, is performed on a combined spectrum, to obtain a new broadband signal, thereby implementing BWE of the narrowband signal.

A bandwidth of the extended broadband signal is greater than a bandwidth of the narrowband signal, so that a speech frame with a sonorous timbre and a relatively high volume can be obtained based on the broadband signal, thereby providing a better listening experience for users.

In the BWE method provided in this embodiment of the present disclosure, the correlation parameter is obtained by using the output of the neural network model. Because the prediction is performed by using the neural network model, no additional bits are required for encoding. The method is a blind analysis method, has relatively good forward compatibility, achieves a spectrum parameter-to-correlation parameter mapping because an output of the model is a parameter that can reflect the correlation between the high-frequency part and the low-frequency part of the target broadband spectrum, and compared with the existing coefficient-to-coefficient mapping manner, has a better generalization capability. Based on the BWE solution in the embodiments of the present disclosure, a signal with a sonorous timbre and a relatively high volume can be obtained, thereby providing a better listening experience for users.

In the solution of the present disclosure, the neural network model may be a model trained or pre-trained based on sample data. Each piece of sample data includes a sample narrowband signal and a sample broadband signal corresponding to the sample narrowband signal. For each piece of sample data, a correlation parameter (the parameter may be understood as annotation information of the sample data, that is, a sample label, which is referred to as an annotation result for short) of a high-frequency part and a low-frequency part of a spectrum of a sample broadband signal of the each piece of sample data can be determined. The correlation parameter includes a high-frequency spectrum envelope, and may further include relative flatness information of the high-frequency part and the low-frequency part of the spectrum of the sample broadband signal. When the neural network model is trained based on the sample data, an input of an initial neural network model is parameters of a low-frequency spectrum of a sample narrowband signal, and an output of the initial neural network model is a predicted correlation parameter (prediction result for short). Whether training of the model ends may be determined based on a similarity between a prediction result and an annotation result that correspond to each piece of sample data. For example, whether the training of the model ends is determined depending on whether a loss function of the model converges, the loss function representing a degree of difference between a prediction result and an annotation result of each piece of sample data. A model obtained when the training ends is used as the neural network model during application of this embodiment of the present disclosure.

In an application stage of the neural network model, for the narrowband signal, the parameters of the low-frequency spectrum of the narrowband signal can be inputted into the trained neural network model, to obtain a correlation parameter corresponding to the narrowband signal. Because when the model is trained based on the sample data, a sample label of the sample data is the correlation parameter of the high-frequency part and the low-frequency part of the sample broadband signal, the correlation parameter of the narrowband signal is obtained based on an output of the neural network model, so that the correlation parameter may well represent a correlation between the high-frequency part and the low-frequency part of the spectrum of the target broadband signal. In the solution of the present disclosure, the determining parameters of a low-frequency spectrum of a narrowband signal may include:

performing upsampling processing, of which a sample factor is a first set value, on the narrowband signal, to obtain an upsampled signal;

performing a time-frequency transform on the upsampled signal to obtain a low-frequency domain coefficient; and determining the low-frequency amplitude spectrum of the narrowband signal based on the low-frequency domain coefficient.

Further, after the low-frequency amplitude spectrum of the narrowband signal is determined, a low-frequency spectrum envelope of the narrowband signal may further be determined based on the low-frequency amplitude spectrum.

In an embodiment of the present disclosure, the parameters of the low-frequency spectrum further include the low-frequency spectrum envelope of the narrowband signal.

Specifically, to enrich data inputted into the neural network model, a parameter related to a spectrum of a low-frequency part may further be selected as an input of the neural network model. The low-frequency spectrum envelope of the narrowband signal is information related to the spectrum of the signal, so that the low-frequency spectrum envelope may be used as an input of the neural network model. Therefore, a more accurate correlation parameter can be obtained based on the low-frequency spectrum envelope and the low-frequency amplitude spectrum. Therefore, a correlation parameter can be obtained by inputting the low-frequency spectrum envelope and the low-frequency amplitude spectrum into the neural network model.

To better describe the solutions provided in the present disclosure, a manner of determining the parameters of the low-frequency spectrum is further described below in detail with reference to an example. In the example, a description is made by using the foregoing speech scenario of PSTN and VoIP interworking, a sampling rate of a speech signal being 8000 Hz, and a frame length of a speech frame being 10 ms, as an example.

In the example, a sampling rate of a PSTN signal is 8000 Hz, and according to the Nyquist sampling theorem, an effective bandwidth of the narrowband signal is 4000 Hz. An objective of this example is to obtain a signal with a bandwidth of 8000 Hz after BWE is performed on the narrowband signal, that is, a bandwidth of the broadband signal is 8000 Hz. Considering that in an actual voice communication scenario, for a signal with an effective bandwidth of 4000 Hz, an upper bound of a general effective bandwidth thereof is 3500 Hz. Therefore, in this solution, an effective bandwidth of actually obtained broadband signal is 7000 Hz, so that an objective of this example is to perform BWE on a signal with a bandwidth of 3500 Hz to obtain a broadband signal with a bandwidth of 7000 Hz, that is, to extend a signal with a sampling rate of 8000 Hz into a signal with a sampling rate of 16000 Hz through BWE.

In this example, a sampling factor is 2, and upsampling processing with a sampling factor of 2 is performed on the narrowband signal, to obtain an upsampled signal with a sampling rate of 16000 Hz. Because the sampling rate of the narrowband signal is 8000 Hz, and a frame length is 10 ms, the upsampled signal corresponds to 160 sample points.

Subsequently, a time-frequency transform is performed on the upsampled signal. The time-frequency transform may be a short-time Fourier transform (STFT) or a fast Fourier transform (FFT). A specific time-frequency transform process is as follows:

An STFT is performed on the upsampled signal, and in consideration of elimination of discontinuity of inter-frame data, frequency points corresponding to a previous speech frame and frequency points corresponding to a current speech frame (the narrowband signal) may be combined into an array, and windowing is performed on the frequency points in the array. In this embodiment, windowing may be performed by using a Hanning window. Subsequently, an FFT is performed on a windowed signal, to obtain low-frequency domain coefficients. In consideration of a conjugate symmetry relationship of the FFT, a first coefficient is a direct-current component. If M low-frequency domain coefficients are obtained, (1+M/2) low-frequency domain coefficients may be selected for subsequent processing.

Specifically, for the upsampled signal including the 160 sample points, 160 sample points corresponding to the previous speech frame and 160 sample points corresponding to the current speech are combined into an array, the array including 320 sample points; and then, windowing (for example, the windowing is performed by using a Hanning window) is performed on the sample points in the array, where it is assumed that a windowed and overlapped signal is $s_{Low}$ (i,j). Subsequently, an FFT is performed on $s_{Low}$(i,j), to obtain 320 low-frequency domain coefficients $S_{Low}$(i,j). Similarly, i is a frame index of a speech frame, and j is an intra-frame sample index (j=0, 1, . . . , 319). In consideration of a conjugate symmetry relationship of the FFT, a first coefficient is a direct-current component. Therefore, only first 161 low-frequency domain coefficients may be considered.

After the low-frequency domain coefficients are obtained, a low-frequency amplitude spectrum of the narrowband signal can be determined based on the low-frequency domain coefficients. Specifically, the low-frequency amplitude spectrum can be calculated by using the following Formula (1):

$$P_{Low}(i,j)=\mathrm{SQRT}(\mathrm{Real}(S_{Low}(i,j))^2+\mathrm{Imag}(S_{Low}(i,j))^2) \quad (1)$$

where $P_{Low}$(i,j) represents the low-frequency amplitude spectrum, $S_{Low}$(i,j) is the low-frequency domain coefficient, Real and Imag are respectively a real part and an imaginary part of the low-frequency domain coefficient, and SQRT is a square root finding operation. If the narrowband signal is a signal with a sampling rate of 16000 Hz and a bandwidth of 0 to 3500 Hz, 70 spectrum coefficients (low-frequency amplitude spectrum coefficients) $P_{Low}$ (i,j)(j=0, 1, . . . , 69) of the low-frequency amplitude spectrum may be determined based on the sampling rate and a frame length of the narrowband signal by using the low-frequency domain coefficients. In an actual application, the 70 calculated low-frequency amplitude spectrum coefficients may be directly used as a low-frequency amplitude spectrum of the narrowband signal. Further, for ease of calculation, the low-frequency amplitude spectrum may be further transformed into a logarithmic domain. That is, a logarithm operation is performed on the amplitude spectrum calculated by using Formula (1), and an amplitude spectrum obtained through the logarithm operation is used as a low-frequency amplitude spectrum during subsequent processing.

After a low-frequency amplitude spectrum including the 70 coefficients is obtained, a low-frequency spectrum envelope of the narrowband signal can be determined based on the low-frequency amplitude spectrum.

In the solution of the present disclosure, the method may further include:

dividing the low-frequency amplitude spectrum into a second quantity of amplitude sub-spectra; and respectively determining a sub-spectrum envelope corresponding to each of the second quantity of amplitude sub-spectra, the low-frequency spectrum envelope including the second quantity of determined sub-spectrum envelopes.

One embodiment of dividing spectrum coefficients of the low-frequency amplitude spectrum into M (the second quantity of) amplitude sub-spectra is: performing band division on the narrowband signal, to obtain M amplitude sub-spectra. Subbands may correspond to the same quantity or different quantities of spectrum coefficients of amplitude sub-spectra. A total quantity of spectrum coefficients corresponding to all the subbands is equal to a quantity of spectrum coefficients of the low-frequency amplitude spectrum.

After the M amplitude sub-spectra are obtained through division, a sub-spectrum envelope corresponding to each amplitude sub-spectrum may be determined based on the each amplitude sub-spectrum. One embodiment is that: a sub-spectrum envelope of each subband, that is, a sub-spectrum envelope corresponding to each amplitude sub-spectrum, may be determined based on spectrum coefficients of the low-frequency amplitude spectrum that correspond to the each amplitude sub-spectrum. If M sub-spectrum envelopes may correspond to M determined amplitude sub-spectra, the low-frequency spectrum envelope includes the M determined sub-spectrum envelopes.

In an example, for the foregoing 70 spectrum coefficients (which may be coefficients calculated based on Formula (1) or coefficients calculated based on Formula (1) and then transformed into a logarithmic domain) of the low-frequency amplitude spectrum, if each subband includes the same quantity of spectrum coefficients, for example, five spectrum coefficients, a band corresponding to spectrum coefficients of every five amplitude sub-spectra may be divided into one subband. In this case, 14 (M=14) subbands are obtained through division, and each subband corresponds to five spectrum coefficients. Therefore, after 14 amplitude sub-spectra are obtained through division, 14 sub-spectrum envelopes can be determined based on the 14 amplitude sub-spectra.

The determining a sub-spectrum envelope corresponding to each amplitude sub-spectrum may include:

obtaining the sub-spectrum envelope corresponding to the each amplitude sub-spectrum based on logarithm values of spectrum coefficients included in the each amplitude sub-spectrum.

Specifically, a sub-spectrum envelope corresponding to each amplitude sub-spectrum is determined based on spectrum coefficients of the each amplitude sub-spectrum by using Formula (2).

Formula (2) is:

$$e_{Low}(i,k) = \frac{\sum_{j=0}^{4} \log(P_{Low}(i, k*5+j))}{5} \tag{2}$$

where $e_{Low}$ (i,k) represents a sub-spectrum envelope, i is a frame index of a speech frame, k represents an index number of a subband, and there are M subbands in total, and k=0, 1, 2, . . . , M, so that the low-frequency spectrum envelope includes M sub-spectrum envelopes.

Generally, a spectrum envelope of a subband is defined as average energy (or further transformed into a logarithmic representation) of adjacent coefficients. However, this manner may cause a coefficient with a relatively small amplitude to fail to play a substantive role. This embodiment of the present disclosure provides a solution of directly averaging logarithm identities of spectrum coefficients included in each amplitude sub-spectrum to obtain a sub-spectrum envelope corresponding to the each amplitude sub-spectrum, which, compared with an existing common envelope determining solution, can better protect a coefficient with a relatively small amplitude in distortion control during training of the neural network model, so that more signal parameters can play corresponding roles in the BWE.

In an example, there are 70 spectrum coefficients of the low-frequency amplitude spectrum, each subband corresponds to the same quantity of spectrum coefficients, and 14 subbands in total are obtained through division, so that there are 14 amplitude sub-spectra, and each amplitude sub-spectrum corresponds to five spectrum coefficients. That is, five adjacent spectrum coefficients correspond to one subband, each subband corresponds to five spectrum coefficients, and the low-frequency spectrum envelope includes 14 sub-spectrum envelopes.

Therefore, if the low-frequency amplitude spectrum and the low-frequency spectrum envelope are used as an input of the neural network model, the low-frequency amplitude spectrum is 70-dimensional data, and the low-frequency spectrum envelope is 14-dimensional data, the input of the model is 84-dimensional data. In this way, the neural network model in this solution has a small volume and low complexity.

In the solution of the present disclosure, in step S130, the obtaining a target high-frequency amplitude spectrum based on the correlation parameter and the low-frequency amplitude spectrum may include:

obtaining a low-frequency spectrum envelope of the narrowband signal according to the low-frequency amplitude spectrum;

generating an initial high-frequency amplitude spectrum based on the low-frequency amplitude spectrum; and adjusting the initial high-frequency amplitude spectrum based on the high-frequency spectrum envelope and the low-frequency spectrum envelope, to obtain the target high-frequency amplitude spectrum.

Specifically, the initial high-frequency amplitude spectrum may be obtained by replicating the low-frequency amplitude spectrum. It may be understood that in an actual application, for a specific manner of replicating the low-frequency amplitude spectrum, the replicating manner may differ as a bandwidth of the broadband signal that needs to be finally obtained and a bandwidth of a low-frequency amplitude spectrum part that is selected for replication differ. For example, it is assumed that a bandwidth of the broadband signal is two times a bandwidth of the narrowband signal. If the entire low-frequency amplitude spectrum of the narrowband signal is selected for replication, replication only needs to be performed once. If a part of the low-frequency amplitude spectrum of the narrowband signal is selected for replication, replication needs to be performed a corresponding quantity of times according to a bandwidth corresponding to the selected part. If ½ of the low-frequency amplitude spectrum of the narrowband signal is selected for replication, replication needs to be performed twice. If ¼ of the low-frequency amplitude spectrum of the narrowband signal is selected for replication, replication needs to be performed four times.

In an example, if a bandwidth of an extended broadband signal is 7 kHz, and a bandwidth corresponding to a low-frequency amplitude spectrum selected for replication is 1.75 kHz, the bandwidth corresponding to the low-frequency amplitude spectrum may be replicated three times based on the bandwidth corresponding to the low-frequency amplitude spectrum and the bandwidth of the extended broadband signal, to obtain a bandwidth (5.25 kHz) corresponding to the initial high-frequency amplitude spectrum. If a bandwidth corresponding to a low-frequency amplitude spectrum selected for replication is 3.5 kHz, and a bandwidth of an extended broadband signal is 7 kHz, a bandwidth (3.5 kHz) corresponding to the initial high-frequency amplitude spectrum can be obtained by replicating the bandwidth corresponding to the low-frequency amplitude spectrum once.

In an implementation of the present disclosure, an implementation of the generating an initial high-frequency amplitude spectrum based on the low-frequency amplitude spectrum may be: replicating an amplitude spectrum of a high-frequency band part in the low-frequency amplitude spectrum, to obtain an initial high-frequency amplitude spectrum.

A low-frequency band part of the low-frequency amplitude spectrum includes a large quantity of harmonic waves, which affects signal quality of an extended broadband signal. Therefore, an amplitude spectrum of the high-frequency band part in the low-frequency amplitude spectrum may be selected for replication, to obtain an initial high-frequency amplitude spectrum.

In an example, descriptions are continued by using the foregoing scenario as an example. The low-frequency amplitude spectrum corresponds to 70 frequency points in total. If the 35th frequency point to the 69th frequency point that correspond to the low-frequency amplitude spectrum (an amplitude spectrum of a high-frequency band part in the low-frequency amplitude spectrum) are selected as to-be-replicated frequency points, that is, a "master", and an effective bandwidth of an extended broadband signal is 7000 Hz, the selected frequency points corresponding to the low-frequency amplitude spectrum need to be replicated to obtain an initial high-frequency amplitude spectrum including 70 frequency points. To obtain the initial high-frequency amplitude spectrum including 70 frequency points, the 35th frequency point to the 69th frequency point that correspond to the low-frequency amplitude spectrum, which are 35 frequency points in total, may be replicated twice, to generate an initial high-frequency amplitude spectrum. Similarly, if the 0th frequency point to the 69th frequency point that correspond to the low-frequency amplitude spectrum are selected as to-be-replicated frequency points, and an effective bandwidth of an extended broadband signal is 7000 Hz, the 0th frequency point to the 69th frequency point that correspond to the low-frequency amplitude spectrum, which are 70 frequency points in total, may be replicated once to generate an initial high-frequency amplitude spectrum. The initial high-frequency amplitude spectrum includes 70 frequency points in total.

A signal corresponding to the low-frequency amplitude spectrum may include a large quantity of harmonic waves, and a signal corresponding to an initial high-frequency amplitude spectrum that is obtained merely through replication also includes a large quantity of harmonic waves. Therefore, to reduce harmonic waves in the broadband signal after BWE, the initial high-frequency amplitude spectrum may be adjusted based on a difference between a high-frequency spectrum envelope and a low-frequency spectrum envelope, and the adjusted initial high-frequency amplitude spectrum is used as a target high-frequency amplitude spectrum, thereby reducing harmonic wave in the broadband signal that is finally obtained after BWE.

In the solution of the present disclosure, both the high-frequency spectrum envelope and the low-frequency spectrum envelope are spectrum envelopes in a logarithmic domain, and the adjusting the initial high-frequency amplitude spectrum based on the high-frequency spectrum envelope and the low-frequency spectrum envelope, to obtain the target high-frequency amplitude spectrum may include:

determining a difference between the high-frequency spectrum envelope and the low-frequency spectrum envelope; and adjusting the initial high-frequency amplitude spectrum based on the difference, to obtain the target high-frequency amplitude spectrum.

Specifically, the high-frequency spectrum envelope and the low-frequency spectrum envelope may be represented by using spectrum envelopes in a logarithmic domain, so that the initial high-frequency amplitude spectrum may be adjusted based on the determined first difference between the spectrum envelopes in the logarithmic domain, to obtain a target high-frequency amplitude spectrum. The high-frequency spectrum envelope and the low-frequency spectrum envelope are represented by using the spectrum envelopes in the logarithmic domain to facilitate calculation.

In the solution of the present disclosure, the high-frequency spectrum envelope includes a first quantity of first sub-spectrum envelopes, and the initial high-frequency amplitude spectrum includes the first quantity of amplitude sub-spectra, each of the first quantity of first sub-spectrum envelopes being determined based on a corresponding amplitude sub-spectrum in the initial high-frequency amplitude spectrum.

Further, the determining a difference between the high-frequency spectrum envelope and the low-frequency spectrum envelope, and adjusting the initial high-frequency amplitude spectrum based on the difference, to obtain the target high-frequency amplitude spectrum may include:

determining a difference between each first sub-spectrum envelope and a corresponding spectrum envelope in the low-frequency spectrum envelope (the corresponding spectrum envelope in the low-frequency spectrum envelope is described as a second sub-spectrum envelope below);

adjusting a corresponding initial amplitude sub-spectrum based on the difference corresponding to the each first sub-spectrum envelope, to obtain the first quantity of adjusted amplitude sub-spectra; and obtaining the target high-frequency amplitude spectrum based on the first quantity of adjusted amplitude sub-spectra.

Specifically, a first sub-spectrum envelope may be determined based on a corresponding amplitude sub-spectrum in a corresponding initial high-frequency amplitude spectrum, and a second sub-spectrum envelope may also be determined based on a corresponding amplitude sub-spectrum in a corresponding low-frequency amplitude spectrum. A quantity of spectrum coefficients corresponding to each amplitude sub-spectrum may be the same or different. If each sub-spectrum envelope is determined based on a corresponding amplitude sub-spectrum in a corresponding amplitude spectrum, the quantity of spectrum coefficients of amplitude sub-spectra in the corresponding amplitude spectrum corresponding to the each sub-spectrum envelope may also be different. The first quantity and the second quantity may be the same or different. The first quantity is generally not less than the second quantity.

Descriptions are continued by using the foregoing scenario as an example. If the first quantity and the second quantity are the same, an output of the model is a 14-dimensional high-frequency spectrum envelope (the first quantity is 14), and an input of the model includes a low-frequency amplitude spectrum and a low-frequency spectrum envelope, where if the low-frequency amplitude spectrum includes a 70-dimensional low-frequency domain coefficient, and the low-frequency spectrum envelope includes a 14-dimensional sub-spectrum envelope (the second quantity is 14), an input of the model is 84-dimensional data. An output dimension is far less than an input dimension, so that the low-frequency spectrum envelope is divided into a third quantity of sub-spectrum envelopes, which can reduce a volume and a depth of the neural network model, and reduce complexity of the model.

Specifically, the high-frequency spectrum envelope obtained by using the neural network model may include a first quantity of first sub-spectrum envelopes. It can be learned from the foregoing description that the first quantity of first sub-spectrum envelopes are determined based on corresponding amplitude sub-spectra in the low-frequency amplitude spectrum. That is, one sub-spectrum envelope is determined based on one corresponding amplitude sub-spectrum in the low-frequency amplitude spectrum. Descriptions are continued by using the foregoing scenario as an example. If there are 14 amplitude sub-spectra in the low-frequency amplitude spectrum, then the high-frequency spectrum envelope includes 14 sub-spectrum envelopes.

Therefore, the difference between the high-frequency spectrum envelope and the low-frequency spectrum envelope is a difference between each first sub-spectrum envelope and a corresponding second sub-spectrum envelope, and adjusting the high-frequency spectrum envelope based on the difference is adjusting a corresponding initial amplitude sub-spectrum based on the difference between the each first sub-spectrum envelope and the corresponding second sub-spectrum envelope. Descriptions are continued by using the foregoing scenario as an example. If the first quantity and the second quantity are the same, that is, the high-frequency spectrum envelope includes 14 first sub-spectrum envelopes, and the low-frequency spectrum envelope includes 14 second sub-spectrum envelopes, 14 differences may be determined based on the 14 determined second sub-spectrum envelopes and 14 corresponding first sub-spectrum envelopes, and initial amplitude sub-spectra corresponding to corresponding subbands are adjusted based on the 14 differences.

In the solution of the present disclosure, the correlation parameter further includes relative flatness information, the relative flatness information representing a correlation between a spectrum flatness of the high-frequency part of the target broadband spectrum and a spectrum flatness of the low-frequency part of the target broadband spectrum.

The determining a difference between the high-frequency spectrum envelope and the low-frequency spectrum envelope may include:

- determining a gain adjustment value of the high-frequency spectrum envelope based on the relative flatness information and energy information of the low-frequency spectrum;
- adjusting the high-frequency spectrum envelope based on the gain adjustment value, to obtain an adjusted high-frequency spectrum envelope; and
- determining a difference between the adjusted high-frequency spectrum envelope and the low-frequency spectrum envelope.

Based on the foregoing descriptions, during training of the neural network model, an annotation result may include relative flatness information. That is, a sample label of sample data includes relative flatness information of a high-frequency part and a low-frequency part of a sample broadband signal, the relative flatness information being determined based on the high-frequency part and the low-frequency part of a spectrum of the sample broadband signal. Therefore, during application of the neural network model, when an input of the model is parameters of a low-frequency spectrum of a narrowband signal, relative flatness information of a high-frequency part and a low-frequency part of a target broadband spectrum may be predicted based on an output of the neural network model.

The relative flatness information may reflect a relative spectrum flatness between the high-frequency part and the low-frequency part of the target broadband spectrum, that is, whether a spectrum of the high-frequency part is flat relative to that of the low-frequency part. If a correlation parameter further includes the relative flatness information, a high-frequency spectrum envelope may first be adjusted based on the relative flatness information and energy information of a low-frequency spectrum, and then an initial high-frequency spectrum is adjusted based on a difference between an adjusted high-frequency spectrum envelope and a low-frequency spectrum envelope, to reduce harmonic waves in a finally obtained broadband signal. The energy information of the low-frequency spectrum may be determined based on spectrum coefficients of a low-frequency amplitude spectrum, and the energy information of the low-frequency spectrum may represent a spectrum flatness.

In this embodiment of the present disclosure, the correlation parameter may include the high-frequency spectrum envelope and the relative flatness information. The neural network model includes at least an input layer and an output layer, a feature vector (the feature vector includes a 70-dimensional low-frequency amplitude spectrum and a 14-dimensional low-frequency spectrum envelope) of parameters of a low-frequency spectrum is inputted into the input layer, and the output layer includes at least a unilateral LSTM layer and two fully connected network layers that are respectively connected to the LSTM layer. Each fully connected network layer may include at least one fully connected layer, where the LSTM layer transforms a feature vector processed by the input layer. One fully connected network layer performs first classification according to a vector value transformed by the LSTM layer and outputs the high-frequency spectrum envelope (14-dimensional), and the other fully connected network layer performs second classification according to the vector value transformed by the LSTM layer and outputs the relative flatness information (4-dimensional).

Figure 2:
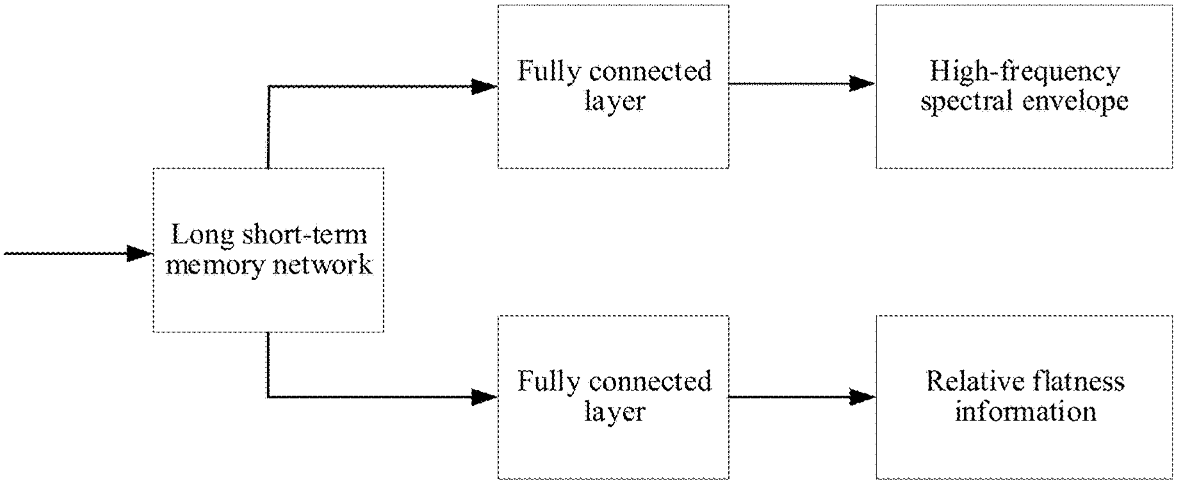
FIG. 2 is a schematic diagram of a network structure of a neural network model according to an embodiment of the present disclosure.

In an example, FIG. 2 is a schematic structural diagram of a neural network model according to an embodiment of the present disclosure. As shown in the figure, the neural network model may mainly include two parts: a unilateral LSTM layer and two fully connected layers. That is, each fully connected network layer in the example includes one fully connected layer. An output of one fully connected layer is the high-frequency spectrum envelope, and an output of the other fully connected layer is the relative flatness information.

In the solution of the present disclosure, the relative flatness information includes relative flatness information corresponding to at least two subband regions of the high-frequency part, relative flatness information corresponding to one subband region representing a correlation between a spectrum flatness of the subband region of the high-frequency part and a spectrum flatness of a high-frequency band of the low-frequency part.

The relative flatness information is determined based on the high-frequency part and the low-frequency part of the spectrum of the sample broadband signal. Because harmonic waves included in a low-frequency band of the low-frequency part of the sample narrowband signal are richer, a high-frequency band in the low-frequency part of the sample narrowband signal may be selected as a reference for determining the relative flatness information. The high-frequency band of the low-frequency part is used as a master, and the high-frequency part of the sample broadband signal is classified into at least two subband regions. Relative flatness information of each subband region is determined based on a spectrum of the corresponding subband region and a spectrum of the low-frequency part.

Based on the foregoing descriptions, during training of the neural network model, an annotation result may include relative flatness information of each subband region. That is, a sample label of sample data may include relative flatness information of the each subband region of a high-frequency part and a low-frequency part of a sample broadband signal, the relative flatness information being determined based on a spectrum of a subband region of the high-frequency part and a spectrum of the low-frequency part of the sample broadband signal. Therefore, during application of the neural network model, when an input of the model is parameters of a low-frequency spectrum of a narrowband signal, relative flatness information of a subband region of a high-frequency part and a low-frequency part of a target broadband spectrum may be predicted based on an output of the neural network model.

If the high-frequency part includes amplitude spectra of at least two subband regions, in correspondence to the at least two subband regions, the relative flatness information also includes relative flatness information corresponding to the at least two subband regions. Harmonic waves included in a low-frequency band of the low-frequency part are richer, so that a high-frequency band of the low-frequency part is selected as a reference for determining the relative flatness information. The high-frequency band of the low-frequency part is used as a master, and relative flatness information is determined based on amplitude spectra of the at least two subband regions of the high-frequency part and an amplitude spectrum of the low-frequency part.

To achieve the objective of BWE, a quantity of spectrum parameters of an amplitude spectrum of the low-frequency part of the target broadband spectrum may be the same or different from a quantity of spectrum coefficients of an amplitude spectrum of the high-frequency part of the target broadband spectrum; and a quantity of spectrum coefficients corresponding to each subband region may be the same or different, provided that a total quantity of spectrum coefficients corresponding to at least two subband regions is consistent with a quantity of spectrum coefficients corresponding to the initial high-frequency amplitude spectrum.

In an example, the at least two subband regions are two subband regions, which are respectively a first subband region and a second subband region; the high-frequency band of the low-frequency part is a band corresponding to the $35^{th}$ frequency point to the $69^{th}$ frequency point; a quantity of spectrum coefficients corresponding to the first subband region is the same as a quantity of spectrum coefficients corresponding to the second subband region; and a total quantity of spectrum coefficients corresponding to the first subband region and the second subband region is the same as a quantity of spectrum coefficients corresponding to the low-frequency part. Therefore, a band corresponding to the first subband region is a band corresponding to the $70^{th}$ frequency point to the $104^{th}$ frequency point; a band corresponding to the second subband region is a band corresponding to the $105^{th}$ frequency point to the $139^{th}$ frequency point; and a quantity of spectrum coefficients of an amplitude spectrum of each subband region is 35, which is the same as a quantity of spectrum coefficients of an amplitude spectrum of the high-frequency band of the low-frequency part. If a selected high-frequency band of the low-frequency part is a band corresponding to the $56^{th}$ frequency point to the $69^{th}$ frequency point, the high-frequency part may be classified into five subband regions, and each subband region corresponds to 14 spectrum coefficients.

The determining a gain adjustment value of the high-frequency spectrum envelope based on the relative flatness information and energy information of the low-frequency spectrum may include:

determining a gain adjustment value of a corresponding spectrum envelope part in the high-frequency spectrum envelope based on relative flatness information corresponding to each subband region and spectrum energy information corresponding to each subband region in the low-frequency spectrum.

The adjusting the high-frequency spectrum envelope based on the gain adjustment value may include:

adjusting each corresponding spectrum envelope part based on a gain adjustment value of the corresponding spectrum envelope part in the high-frequency spectrum envelope.

Specifically, if the high-frequency part includes at least two subband regions, a gain adjustment value of a corresponding spectrum envelope part in the high-frequency spectrum envelope corresponding to each subband region may be determined based on relative flatness information corresponding to each subband region and spectrum energy information corresponding to each subband region in the low-frequency spectrum; and then the corresponding spectrum envelope part is adjusted according to the determined gain adjustment value.

In an example, the at least two subband regions described above are two subband regions, which are respectively a first subband region and a second subband region. Relative flatness information of the first subband region and the high-frequency band of the low-frequency part is first relative flatness information; and relative flatness information of the second subband region and high-frequency band of the low-frequency part is second relative flatness information. An envelope part of a high-frequency spectrum envelope corresponding to the first subband region may be adjusted based on a gain adjustment value determined based on the first relative flatness information and spectrum energy information corresponding to the first subband region; and an envelope part of a high-frequency spectrum envelope corresponding to the second subband region may be adjusted based on a gain adjustment value determined based on the second relative flatness information and spectrum energy information corresponding to the second subband region.

In the solution of the present disclosure, because harmonic waves included in a low-frequency band of the low-frequency part of the sample narrowband signal are richer, a high-frequency band in the low-frequency part of the sample narrowband signal may be selected as a reference for determining the relative flatness information. The high-frequency band of the low-frequency part is used as a master, and the high-frequency part of the sample broadband signal is classified into at least two subband regions. Relative flatness information of each subband region is determined based on a spectrum of the each subband region of the high-frequency part and a spectrum of the low-frequency part.

Based on the foregoing descriptions, in a training stage of the neural network model, relative flatness information of each subband region in a high-frequency part of a spectrum of a sample broadband signal may be determined based on sample data (the sample data includes a sample narrowband signal and a corresponding sample broadband signal) by using a variance analysis method.

In an example, if a high-frequency part of a sample broadband signal is classified into two subband regions, which are respectively a first subband region and a second subband region, relative flatness information of a high-frequency part and a low-frequency part of the sample broadband signal may be first relative flatness information of the first subband region and a high-frequency band of the low-frequency part of the sample broadband signal and second relative flatness information of the second subband region and the high-frequency band of the low-frequency part of the sample broadband signal.

A specific determining manner of the first relative flatness information and the second relative flatness information may be:

calculating the following three variances based on an amplitude spectrum $P_{Low,sample}(i,j)$ of the sample narrowband signal and an amplitude spectrum $P_{High,sample}(i,j)$ of the high-frequency part of the sample broadband signal by using Formula (3) to Formula (5):

$$var_L(P_{Low,sample}(i,j)), j=35,36,\ldots,69 \tag{3}$$

$$var_{H1}(P_{High,sample}(i,j)), j=70,71,\ldots,104 \tag{4}$$

$$var_{H2}(P_{High,sample}(i,j)), j=105,106,\ldots,139 \tag{5}$$

where Formula (3) is a variance of an amplitude spectrum of the high-frequency band of the low-frequency part of the sample narrowband signal; Formula (4) is a variance of an amplitude spectrum of the first subband region; Formula (5) is a variance of an amplitude spectrum of the second subband region; and var( ) represents variance calculation.

Relative flatness information of an amplitude spectrum of each subband region and the amplitude spectrum of the high-frequency band of the low-frequency part are determined based on the foregoing three variances by using Formula (6) and Formula (7).

$$fc(0) = \log\left(\frac{var_L}{var_{H1}}\right) \tag{6}$$

$$fc(1) = \log\left(\frac{var_L}{var_{H2}}\right) \tag{7}$$

where fc(0) represents first relative flatness information of the amplitude spectrum of the first subband region and the amplitude spectrum of the high-frequency band of the low-frequency part, and fc(1) represents second relative flatness information of the amplitude spectrum of the second subband region and the amplitude spectrum of the high-frequency band of the low-frequency part.

The two values fc(0) and fc(1) may be classified depending on whether the two values are greater than or equal to 0 (in this embodiment of the present disclosure, 1 is used for representing being greater than or equal to 0, and 0 is used for representing being less than 0), and fc(0) and fc(1) are defined as a binary classification array, so that the array includes four permutations and combinations: {0,0}, {0,1}, {1,0}, {1,1}.

In this way, relative flatness information outputted by the model may be four probability values, the probability values being used for identifying probabilities that the relative flatness information belongs to the four arrays.

Based on the principle of maximum probability, one of the four permutations and combinations of the array may be selected as predicted relative flatness information of amplitude spectra of the two subband regions and an amplitude spectrum of the high-frequency band of the low-frequency part. Specifically, the relative flatness information may be represented by using Formula (8):

$$v(i,k)=0 \text{ or } 1, k=0,1 \tag{8}$$

where v(i,k) represents the relative flatness information of the amplitude spectra of the two subband regions and the amplitude spectrum of the high-frequency band of the low-frequency part, and k represents an index of a different subband region, so that each subband region can correspond to one piece of relative flatness information. For example, when k=0, v(i,k)=0 represents that the first subband region is more oscillatory than the low-frequency part, that is, have a poorer flatness; and v(i,k)=1 represents that the first subband region is flatter than the low-frequency part, that is, have a better flatness.

In this embodiment of the present disclosure, the parameters of the low-frequency spectrum of the narrowband signal are inputted into a trained neural network model, and relative flatness information of a high-frequency part of a target broadband spectrum may be predicted by using the neural network model. If parameters of the low-frequency spectrum corresponding to a high-frequency band of a low-frequency part of the narrowband signal are used as an input of the neural network model, relative flatness information of at least two subband regions of the high-frequency part of the target broadband spectrum can be predicted based on the trained neural network model. In the solution of the present disclosure, when the high-frequency spectrum envelope includes a first quantity of first sub-spectrum envelopes, the determining a gain adjustment value of a corresponding spectrum envelope part in the high-frequency spectrum envelope based on relative flatness information corresponding to each subband region and spectrum energy information corresponding to each subband region in the low-frequency spectrum may include:

determining, for each first sub-spectrum envelope, a gain adjustment value of the each first sub-spectrum envelope according to spectrum energy information corresponding to a spectrum envelope, corresponding to the each first sub-spectrum envelope, in the low-frequency spectrum envelope (the spectrum envelope, corresponding to the each first sub-spectrum envelope, in the low-frequency spectrum envelope is described as a second sub-spectrum envelope below), relative flatness information corresponding to a subband region corresponding to the second sub-spectrum envelope, and spectrum energy information corresponding to the subband region corresponding to the second sub-spectrum envelope.

The adjusting each corresponding spectrum envelope part according to a gain adjustment value of the corresponding spectrum envelope part in the high-frequency spectrum envelope may include:

adjust each first sub-spectrum envelope according to a gain adjustment value of the corresponding first sub-spectrum envelope in the high-frequency spectrum envelope.

Specifically, each first sub-spectrum envelope of the high-frequency spectrum envelope corresponds to one gain adjustment value. The gain adjustment value is determined based on spectrum energy information corresponding to the second sub-spectrum envelope, relative flatness information corresponding to a subband region corresponding to the second sub-spectrum envelope, and spectrum energy information corresponding to the subband region corresponding to the second sub-spectrum envelope. In addition, the second sub-spectrum envelope corresponds to the first sub-spectrum envelope, and the high-frequency spectrum envelope includes a first quantity of first sub-spectrum envelopes, so that the high-frequency spectrum envelope includes a first quantity of corresponding gain adjustment values.

It may be understood that if the high-frequency part corresponds to at least two subband regions, for the high-frequency spectrum envelope corresponding to the at least two subband regions, a first sub-spectrum envelope of each subband region may be adjusted based on a gain adjustment value corresponding to the first sub-spectrum envelope corresponding to the corresponding subband region.

An example in which the first subband region includes 35 frequency points is used below. One embodiment of determining a gain adjustment value of a first sub-spectrum envelope corresponding to a second sub-spectrum envelope based on spectrum energy information corresponding to the second sub-spectrum envelope, relative flatness information corresponding to a subband region corresponding to the second sub-spectrum envelope, and spectrum energy information corresponding to the subband region corresponding to the second sub-spectrum envelope is as follows:

(1) parsing v(i,k), where if v(i,k) is 1, it indicates that the high-frequency part is very flat; and if v(i,k) is 0, it indicates that the high-frequency part is oscillatory.

(2) dividing 35 frequency points in the first subband region into seven subbands, each subband corresponding to one first sub-spectrum envelope; separately calculating average energy pow_env (the spectrum energy information corresponding to the second sub-spectrum envelope) of each subband, and calculating an average value Mpow_env (the spectrum energy information corresponding to the subband region corresponding to the second sub-spectrum envelope) of average energy of the seven subbands, where the average energy of each subband is determined based on a corresponding low-frequency amplitude spectrum, for example, a square of an absolute value of a spectrum coefficient of each low-frequency amplitude spectrum is used as energy of the low-frequency amplitude spectrum, and one subband corresponds to spectrum coefficients of five low-frequency amplitude spectra, so that an average value of energy of low-frequency amplitude spectra corresponding to a subband can be used as average energy of the subband; and (3) calculating a gain adjustment value of each first sub-spectrum envelope based on parsed relative flatness information corresponding to the first subband region, the average energy pow_env, and the average value Mpow_env, specifically including:

when v(i,k)=1, $G(t)=a_1+b_1$*SQRT(Mpow_env/pow_env(j)), j=0, 1, . . . , 6;

when v(i,k)=0, $G(t)=a_0+b_0$*SQRT(Mpow_env/pow_env(j)), j=0, 1, . . . , 6;

where in a solution, $a_1=0.875$, $b_1=0.125$, $a_0=0.925$, $b_0=0.075$, and G(j) is the gain adjustment value.

For a case that v(i,k)=0, the gain adjustment value is 1, that is, no flattening operation (adjustment) needs to be performed on the high-frequency spectrum envelope.

Based on the foregoing manner, gain adjustment values of the seven first sub-spectrum envelopes in the high-frequency spectrum envelope can be determined, and the corresponding first sub-spectrum envelopes are adjusted based on the gain adjustment values of the seven first sub-spectrum envelopes. The operation can reduce the average energy difference of different subbands, and perform different degrees of flattening processing on the spectrum corresponding to the first subband region.

It may be understood that the high-frequency spectrum envelope corresponding to the second subband region may be adjusted in a manner the same as the above. Details are not described herein again. The high-frequency spectrum envelopes include 14 frequency subbands in total, so that 14 gain adjustment values can be correspondingly determined, and corresponding sub-spectrum envelopes are adjusted based on the 14 gain adjustment values.

In the solution of the present disclosure, the low-frequency spectrum parameters further include a low-frequency domain coefficient, and the obtaining a high-frequency spectrum according to the target high-frequency amplitude spectrum and the high-frequency phase spectrum may include:

generating high-frequency domain coefficients according to the target high-frequency amplitude spectrum and the high-frequency phase spectrum; and generating a high-frequency spectrum based on the low-frequency domain coefficients and the high-frequency domain coefficients.

In the solution of the present disclosure, in step 160, the obtaining a broadband signal after BWE based on a low-frequency spectrum and the high-frequency spectrum may include:

combining the low-frequency spectrum and the high-frequency spectrum, to obtain a broadband spectrum; and performing a frequency-time transform on the broadband spectrum, to obtain a broadband signal after BWE.

Specifically, the broadband signal includes a signal of the low-frequency part in the narrowband signal and a signal of a high-frequency part after extension, so that after the low-frequency spectrum corresponding to the low-frequency part and the high-frequency spectrum corresponding to the high-frequency part are obtained, the low-frequency spectrum and the high-frequency spectrum may be combined, to obtain a broadband spectrum; and then a frequency-time transform (an inverse transform of a time-frequency transform, to transform a frequency-domain signal into a time-domain signal) is performed on the broadband spectrum, so that a target speech signal after BWE can be obtained.

In the solution of the present disclosure, when the narrowband signal includes at least two associated signals, the method may further include:

fusing the at least two associated signals, to obtain a narrowband signal; or respectively using each of the at least two associated signals as a narrowband signal.

Specifically, the narrowband signal may be a plurality of associated signals, for example, adjacent speech frames, so that the at least two associated signals may be fused to obtain one signal, and the one signal is used as a narrowband signal. Subsequently, the narrowband signal is extended by using the BWE method in the present disclosure, to obtain a broadband signal.

Alternatively, each of the at least two associated signals may be used as a narrowband signal, and the narrowband signal is extended by using the BWE method in the present disclosure, to obtain at least two corresponding broadband signals. The at least two broadband signals may be combined into one signal for output, or may be separately outputted. This is not limited in the present disclosure.

To better understand the method provided in the embodiments of the present disclosure, the solutions of the embodiments of the present disclosure are further described below in detail with reference to examples of specific application scenarios.

In an example, an application scenario is a PSTN (narrowband voice) and VoIP (broadband voice) interworking scenario, that is, BWE is performed on the narrowband signal by using narrowband voice corresponding to a PSTN telephone as a narrowband signal, so that a speech frame received on a VoIP receive end is broadband voice, thereby improving the listening experience on the receive end.

In this example, the narrowband signal is a signal with a sampling rate of 8000 Hz and a frame length of 10 ms, and according to the Nyquist sampling theorem, an effective bandwidth of the narrowband signal is 4000 Hz. In an actual voice communication scenario, an upper bound of a general effective bandwidth thereof is 3500 Hz. Therefore, in this example, a description is made by using an example in which an effective bandwidth of an extended broadband signal is 7000 Hz.

Figure 3:
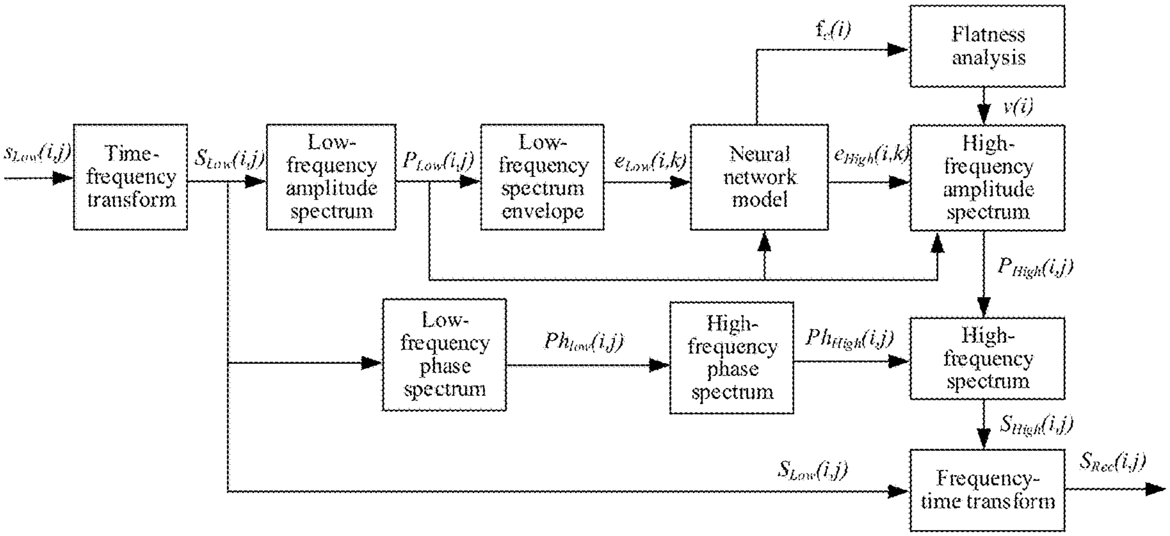
FIG. 3 is a schematic flowchart of a BWE method in an example according to an embodiment of the present disclosure.
Figure 5:
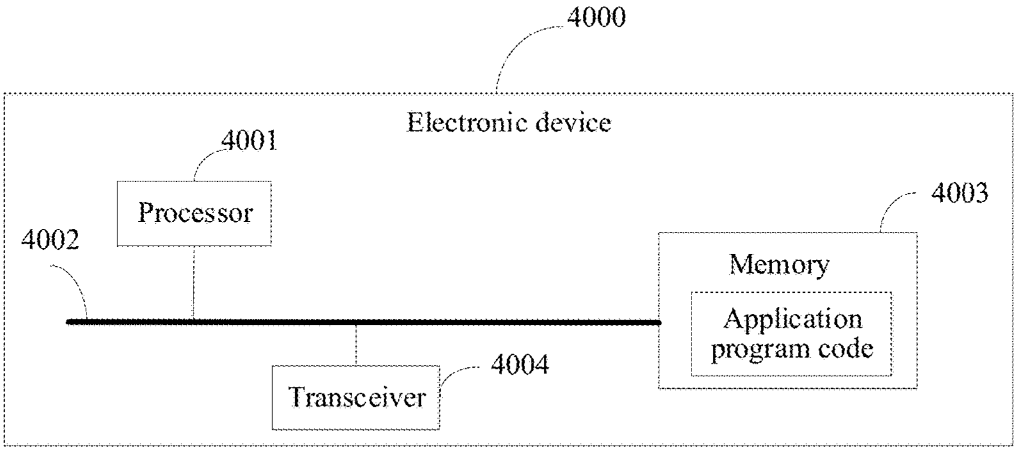
FIG. 5 is a schematic structural diagram of an electronic device according to an embodiment of the present disclosure.

As shown in FIG. 3, the method in this embodiment may be performed by the electronic device shown in FIG. 5, and the method may include the following steps:

Step S1: Front-end signal processing:

performing upsampling processing with a sampling factor of 2 on the narrowband signal, and outputting an upsampled signal with a sampling rate of 16000 Hz.

Because the narrowband signal has a sampling rate of 8000 Hz and a frame length of 10 ms, the upsampled signal corresponds to 160 sample points (frequency points). Performing an STFT on the upsampled signal is specifically: combining 160 sample points corresponding to a previous speech frame and the 160 sample points corresponding to the current speech frame (the narrowband signal) into an array, the array including 320 sample points; then performing windowing on the sample points in the array, where it is assumed that a windowed and overlapped signal is $s_{Low}(i,j)$; and subsequently, performing an FFT on $s_{Low}(i,j)$, to obtain 320 low-frequency domain coefficients $S_{Low}(i,j)$. Similarly, i is a frame index of a speech frame, and j is an intra-frame sample index (j=0, 1, . . . , 319). In consideration of a conjugate symmetry relationship of the FFT, a first coefficient is a direct-current component. Therefore, only first 161 low-frequency domain coefficients may be considered.

Step S2: Feature extraction:

a) Calculate a low-frequency amplitude spectrum based on the low-frequency domain coefficients according to Formula (1):

$$P_{Low}(i,j)=\mathrm{SQRT}(\mathrm{Real}(S_{Low}(i,j))^2+\mathrm{Imag}(S_{Low}(i,j))^2) \quad (1)$$

where $P_{Low}(i,j)$ represents the low-frequency amplitude spectrum, $S_{Low}(i,j)$ is the low-frequency domain coefficient, Real and Imag are respectively a real part and an imaginary part of the low-frequency domain coefficient, and SQRT is a square root finding operation. If the narrowband signal is a signal with a sampling rate of 8000 Hz and an effective bandwidth of 0 to 3500 Hz, 70 spectrum coefficients (low-frequency amplitude spectrum coefficients) $P_{Low}$ (i,j)=0, 1, . . . , 69) of the low-frequency amplitude spectrum may be determined based on the sampling rate and a frame length of the narrowband signal by using the low-frequency domain coefficients. In an actual application, the 70 calculated low-frequency amplitude spectrum coefficients may be directly used as a low-frequency amplitude spectrum of the narrowband signal. Further, for ease of calculation, the low-frequency amplitude spectrum may be further transformed into a logarithmic domain.

After a low-frequency amplitude spectrum including the 70 coefficients is obtained, a low-frequency spectrum envelope of the narrowband signal can be determined based on the low-frequency amplitude spectrum.

b) Further, determine the low-frequency spectrum envelope based on the low-frequency amplitude spectrum in the following manner:

Band division is performed on the narrowband signal, and for 70 spectrum coefficients of the low-frequency amplitude spectrum, a band corresponding to spectrum coefficients of every five adjacent amplitude sub-spectra may be divided into one subband. 14 subbands in total are obtained through division, each subband corresponding to five spectrum coefficients. For each subband, a low-frequency spectrum envelope of the each subband is defined as average energy of adjacent spectrum coefficients. The low-frequency spectrum envelope may be specifically calculated by using Formula (2):

$$e_{Low}(i,k)=\frac{\sum_{j=0}^{4}\log(P_{Low}(i,k*5+j))}{5} \quad (2)$$

where $e_{Low}$ (i,k) represents a sub-spectrum envelope (a low-frequency spectrum envelope of each subband), k represents an index number of a subband, there are 14 subbands in total, and k=0, 1, 2, . . . , 13, so that the low-frequency spectrum envelope includes 14 sub-spectrum envelopes.

Generally, a spectrum envelope of a subband is defined as average energy (or further transformed into a logarithmic representation) of adjacent coefficients. However, this manner may cause a coefficient with a relatively small amplitude to fail to play a substantive role. This embodiment of the present disclosure provides a solution of directly averaging logarithm identities of spectrum coefficients included in each amplitude sub-spectrum to obtain a sub-spectrum envelope corresponding to the each amplitude sub-spectrum, which, compared with an existing common envelope determining solution, can better protect a coefficient with a relatively small amplitude in distortion control during training of the neural network model, so that more signal parameters can play corresponding roles in the BWE.

Therefore, a 70-dimensional low-frequency amplitude spectrum and a 14-dimensional low-frequency spectrum envelope may be used as an input of the neural network model.

Step S3: An input into the neural network model.

Input layer: The 84-dimensional feature vector is inputted into the neural network model.

Output layer: Considering that a target bandwidth of BWE in this embodiment is 7000 Hz, high-frequency spectrum envelopes of 14 subbands corresponding to a band of 3500 Hz to 7000 Hz need to be predicted, and then a basic BWE function can be implemented. Generally, a low-frequency part of a speech frame includes a large quantity of harmonic-like structures such as a pitch and a resonance peak; and a spectrum of a high-frequency part is flatter. If only a low-frequency spectrum is simply replicated to a high-frequency part, to obtain an initial high-frequency amplitude spectrum, and gain control based on subbands is performed on the initial high-frequency amplitude spectrum, the reconstructed high-frequency part may generate excessive harmonic-like structures, which cause distortion, and affect the listening experience. Therefore, in this example, based on relative flatness information predicted by the neural network model, a relative flatness of the low-frequency part, and the high-frequency part is described and the initial high-frequency amplitude spectrum is adjusted, so that the adjusted high-frequency part is flatter, and interference from harmonic waves is reduced.

In this example, an amplitude spectrum of the high-frequency band part in the low-frequency amplitude spectrum is replicated twice, to generate the initial high-frequency amplitude spectrum, and simultaneously a band in the high-frequency part is equally divided into two subband regions, which are respectively a first subband region and a second subband region. The high-frequency part corresponds to 70 spectrum coefficients, and each subband region corresponds to 35 spectrum coefficients. Therefore, flatness analysis is performed on the high-frequency part twice. That is, flatness analysis is performed on each subband region once. The low-frequency part, especially, a band corresponding to a bandwidth less than 1000 Hz, includes richer harmonic wave components. Therefore, in this embodiment, spectrum coefficients corresponding to the $35^{th}$ frequency point to the $69^{th}$ frequency point are used as a "master", so that a band corresponding to the first subband region is a band corresponding to the $70^{th}$ frequency point to the $104^{th}$ frequency point, and a band corresponding to the second subband region is a band corresponding to the $105^{th}$ frequency point to the $139^{th}$ frequency point.

A variance analysis method defined in classical statistics may be used for the flatness analysis. An oscillation degree of a spectrum can be described by using the variance analysis method, and a larger value indicates richer harmonic wave components.

Based on the foregoing descriptions, because harmonic waves included in a low-frequency band of the low-frequency part of the sample narrowband signal are richer, a high-frequency band in the low-frequency part of the sample narrowband signal may be selected as a reference for determining the relative flatness information. That is, the high-frequency band (a band corresponding to the $35^{th}$ frequency point to the $69^{th}$ frequency point) of the low-frequency part is used as a master, and the high-frequency part of the sample broadband signal is correspondingly classified into at least two subband regions. Relative flatness information of each subband region is determined based on a spectrum of the each subband region of the high-frequency part and a spectrum of the low-frequency part.

In a training stage of the neural network model, relative flatness information of each subband region in a high-frequency part of a spectrum of a sample broadband signal may be determined based on sample data (the sample data includes a sample narrowband signal and a corresponding sample broadband signal) by using a variance analysis method.

In an example, if a high-frequency part of a sample broadband signal is classified into two subband regions, which are respectively a first subband region and a second subband region, relative flatness information of a high-frequency part and a low-frequency part of the sample broadband signal may be first relative flatness information of the first subband region and a high-frequency band of the low-frequency part of the sample broadband signal and second relative flatness information of the second subband region and the high-frequency band of the low-frequency part of the sample broadband signal.

A specific manner of determining the first relative flatness information and the second relative flatness information may be:

calculating the following three variances based on an amplitude spectrum $P_{Low,sample}(i,j)$ of the sample narrowband signal and an amplitude spectrum $P_{High,sample}(i,j)$ of the high-frequency part of the sample broadband signal by using Formula (3) to Formula (5):

$$\mathrm{var}_L(P_{Low,sample}(i,j)), j=35,36, \ldots ,69 \tag{3}$$

$$\mathrm{var}_{H1}(P_{High,sample}(i,j)), j=70,71, \ldots ,104 \tag{4}$$

$$\mathrm{var}_{H2}(P_{High,sample}(i,j)), j=105,106, \ldots ,139 \tag{5}$$

where Formula (3) is a variance of an amplitude spectrum of the high-frequency band of the low-frequency part of the sample narrowband signal; Formula (4) is a variance of an amplitude spectrum of the first subband region; Formula (5) is a variance of an amplitude spectrum of the second subband region; and var( ) represents variance calculation.

Relative flatness information of an amplitude spectrum of each subband region and the amplitude spectrum of the high-frequency band of the low-frequency part are determined based on the foregoing three variances by using Formula (6) and Formula (7).

$$fc(0) = \log\left(\frac{var_L}{var_{H1}}\right) \tag{6}$$

$$fc(1) = \log\left(\frac{var_L}{var_{H2}}\right) \tag{7}$$

where fc(0) represents first relative flatness information of the amplitude spectrum of the first subband region and the amplitude spectrum of the high-frequency band of the low-frequency part, and fc(1) represents second relative flatness information of the amplitude spectrum of the second subband region and the amplitude spectrum of the high-frequency band of the low-frequency part.

The two values fc(0) and fc(1) may be classified depending on whether the two values are greater than or equal to 0, and fc(0) and fc(1) are defined as a binary classification array, so that the array includes four permutations and combinations: {0,0}, {0,1}, {1,0}, {1,1}.

In this way, relative flatness information outputted by the model may be four probability values, the probability values being used for identifying probabilities that the relative flatness information belongs to the four arrays.

Based on the principle of maximum probability, one of the four permutations and combinations of the array may be selected as predicted relative flatness information of amplitude spectra of the two subband regions and an amplitude spectrum of the high-frequency band of the low-frequency part. Specifically, the relative flatness information may be represented by using Formula (8):

$$v(i,k)=0 \text{ or } 1, k=0,1 \quad (8)$$

where v(i,k) represents the relative flatness information of the amplitude spectra of the two subband regions and the amplitude spectrum of the high-frequency band of the low-frequency part, and k represents an index of a different subband region. For example, when k is 0, it represents the first subband region, and when k is 1, it represents the second subband region, so that each subband region can correspond to one piece of relative flatness information.

Step S4: Generation of a high-frequency amplitude spectrum:

As described above, the low-frequency amplitude spectrum (including the $35^{th}$ frequency point to the $69^{th}$ frequency point, which are 35 frequency points in total) is replicated twice, to generate a high-frequency amplitude spectrum (including 70 frequency points in total). Predicted relative flatness information of a high-frequency part of a target broadband spectrum can be obtained based on the parameters of the low-frequency spectrum corresponding to the narrowband signal by using the trained neural network model. In this example, frequency domain coefficients of a low-frequency amplitude spectrum corresponding to the $35^{th}$ frequency point to the $69^{th}$ frequency point are selected, so that relative flatness information of at least two subband regions of the high-frequency part of the target broadband spectrum can be predicted by using the trained neural network model. That is, the high-frequency part of the target broadband spectrum is divided into at least two subband regions. In this example, using two subband regions as an example, an output of the neural network model is relative flatness information for the two subband regions.

Post-filtering is performed on a reconstructed high-frequency amplitude spectrum according to the predicted relative flatness information corresponding to the two subband regions. Using the first subband region as an example, the following main steps are included:

(1) parsing v(i,k), where if v(i,k) is 1, it indicates that the high-frequency part is very flat; and if v(i,k) is 0, it indicates that the high-frequency part is oscillatory.

(2) dividing 35 frequency points in the first subband region into seven subbands, where a high-frequency spectrum envelope includes 14 first sub-spectrum envelopes, and a low-frequency spectrum envelope includes 14 second sub-spectrum envelopes, so that each subband may correspond to one first sub-spectrum envelope; separately calculating average energy pow_env (the spectrum energy information corresponding to the second sub-spectrum envelope) of each subband, and calculating an average value Mpow_env (the spectrum energy information corresponding to the subband region corresponding to the second sub-spectrum envelope) of average energy of the seven subbands, where the average energy of each subband is determined based on a corresponding low-frequency amplitude spectrum, for example, a square of an absolute value of a spectrum coefficient of each low-frequency amplitude spectrum is used as energy of the low-frequency amplitude spectrum, and one subband corresponds to spectrum coefficients of five low-frequency amplitude spectra, so that an average value of energy of low-frequency amplitude spectra corresponding to a subband can be used as average energy of the subband; and (3) calculating a gain adjustment value of each first sub-spectrum envelope based on parsed relative flatness information corresponding to the first subband region, the average energy pow_env, and the average value Mpow_env, specifically including:

when v(i,k)=1, $G(t)=a_1+b_1$*SQRT(Mpow_env/pow_env (j)), j=0, 1, . . . , 6;

when v(i,k)=0, $G(t)=a_0+b_0$*SQRT(Mpow_env/pow_env (j)), j=0, 1, . . . , 6;

where in this example, $a_1=0.875$, $b_1=0.125$, $a_0=0.925$, $b_0=0.075$, G(j) is a gain adjustment value.

For a case that v(i,k)=0, the gain adjustment value is 1, that is, no flattening operation (adjustment) needs to be performed on the high-frequency spectrum envelope.

(4) Based on the foregoing manner, a gain adjustment value corresponding to each first sub-spectrum envelope in the high-frequency spectrum envelope $e_{high}(i,k)$ can be determined, and the corresponding first sub-spectrum envelope is adjusted based on the gain adjustment value corresponding to each first sub-spectrum envelope. The operation can reduce the average energy difference of different subbands, and perform different degrees of flattening processing on the spectrum corresponding to the first subband region.

It may be understood that the high-frequency spectrum envelope corresponding to the second subband region may be adjusted in a manner the same as the above. Details are not described herein again. The high-frequency spectrum envelopes include 14 frequency subbands in total, so that 14 gain adjustment values can be correspondingly determined, and corresponding sub-spectrum envelopes are adjusted based on the 14 gain adjustment values.

Further, a first difference between the adjusted high-frequency spectrum envelope and the low-frequency spectrum envelope is determined based on the adjusted high-frequency spectrum envelope, and the initial high-frequency amplitude spectrum is adjusted based on the difference, to obtain a target high-frequency amplitude spectrum $P_{High}(i,j)$.

Step S5: Generation of a high-frequency spectrum:

Generating a corresponding high-frequency phase spectrum Ph*High*(i,j) based on a low-frequency phase spectrum $Ph_{low}(i,j)$ may include any one of the following manners:

First manner: A corresponding high-frequency phase spectrum is obtained by replicating the low-frequency phase spectrum.

Second manner: The low-frequency phase spectrum is flipped, and a phase spectrum the same as the low-frequency phase spectrum is obtained after the flipping. The two low-frequency phase spectra are mapped to corresponding high-frequency points, to obtain a corresponding high-frequency phase spectrum.

High-frequency domain coefficients $S_{High}(i,j)$ are generated according to the high-frequency amplitude spectrum and the high-frequency phase spectrum; and a high-frequency spectrum is generated based on the low-frequency domain coefficients and the high-frequency domain coefficients.

Step S6: Frequency-time transform:

obtaining a broadband signal after BWE based on a low-frequency spectrum and the high-frequency spectrum.

Specifically, the low-frequency domain coefficients $S_{Low}(i,j)$ and the high-frequency domain coefficients $S_{High}(i,j)$ are combined, to generate a high-frequency spectrum. An inverse transform of a time-frequency transform is performed based on the low-frequency spectrum and the high-frequency spectrum, and a new speech frame $s_{Rec}(i,j)$, that is, a broadband signal, can be generated. In this case, an effective spectrum of the narrowband signal has been extended into 7000 Hz.

By using the method in the related art, in a speech communication scenario of PSTN and VoIP interworking, only narrowband voice (of which a sampling rate is 8 kHz and an effective bandwidth is generally 3.5 kHz) from a PSTN can be received on a VoIP side. An intuitive feeling of a user is that sound is not sonorous enough, a volume is not high enough, and intelligibility is mediocre. When BWE is performed based on the technical solutions disclosed in the present disclosure, no additional bits are required, and an effective bandwidth can be extended to 7 kHz on a receive end of the VoIP side. The user can intuitively feel a more sonorous timbre, a higher volume, and better intelligibility. In addition, based on the solutions, there is no forward compatibility problem, that is, it is unnecessary to modify a protocol, and prefect compatibility with the PSTN can be achieved.

In the embodiments of the present disclosure, the method of the present disclosure may be applied to a downstream side of a PSTN-VoIP channel. For example, functional modules of the solutions provided in the embodiments of the present disclosure may be integrated on a client in which a conference system is installed, so that BWE on a narrowband signal can be implemented on the client, to obtain a broadband signal. Specifically, signal processing in the scenario is a signal post processing technology. By using the PSTN (an encoding system may be ITU-T G.711) as an example, in the conference system client, a speech frame is restored after G.711 decoding is completed; and the post processing technology related to implementation of the present disclosure is used for the speech frame, which enables a VoIP user to receive a broadband signal even if a signal on a transmit end is a narrowband signal.

The method in the embodiments of the present disclosure may alternatively be applied to a mixing server of a PSTN-VoIP channel. After BWE is performed by using the mixing server, a broadband signal after BWE is transmitted to a VoIP client. After receiving a VoIP bitstream corresponding to the broadband signal, the VoIP client can restore, by decoding the VoIP bitstream, broadband voice outputted through BWE. A typical function in the mixing server is performing transcoding, for example, transcoding a bitstream in a PSTN link (for example, through G.711 encoding) into a bitstream (for example, an Opus or a SILK) that is commonly used in the VoIP. On the mixing server, a speech frame after G.711 decoding may be upsampled to 16000 Hz, and then BWE is completed by using the solutions provided in the embodiments of the present disclosure; and then a bitstream commonly used in the VoIP is obtained through transcoding. When receiving one or more VoIP bitstreams, the VoIP client can restore, through decoding, broadband voice outputted through BWE.

Figure 4:
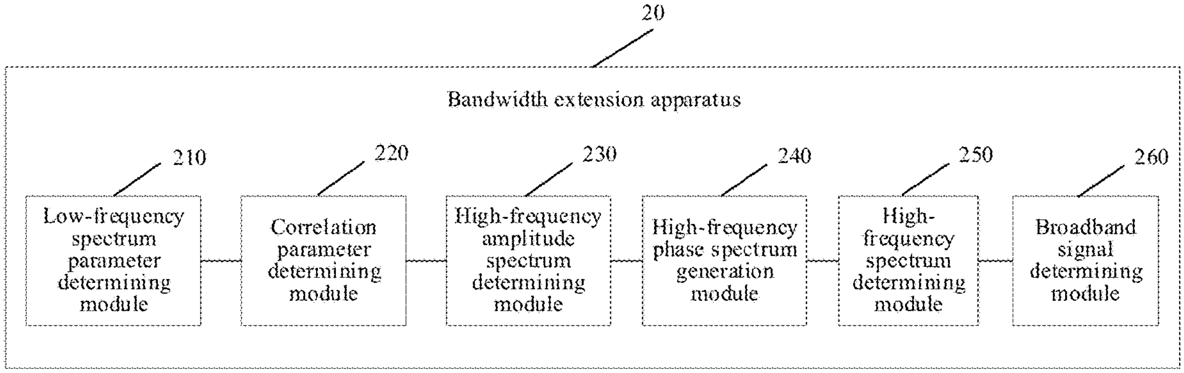
FIG. 4 is a schematic structural diagram of a BWE apparatus according to an embodiment of the present disclosure.

Based on the same principle of the method shown in FIG. 1B, an embodiment of the present disclosure further provides a BWE apparatus 20. As shown in FIG. 4, the BWE apparatus 20 may include a low-frequency spectrum parameter determining module 210, a correlation parameter determining module 220, a high-frequency amplitude spectrum determining module 230, a high-frequency phase spectrum generation module 240, a high-frequency spectrum determining module 250, and a broadband signal determining module 260.

The low-frequency spectrum parameter determining module 210 is configured to determine parameters of a low-frequency spectrum of a narrowband signal, the parameters of the low-frequency spectrum including a low-frequency amplitude spectrum.

The correlation parameter determining module 220 is configured to: input the parameters of the low-frequency spectrum into a neural network model, and obtain a correlation parameter based on an output of the neural network model, the correlation parameter representing a correlation between a high-frequency part and a low-frequency part of a target broadband spectrum and including a high-frequency spectrum envelope.

The high-frequency amplitude spectrum determining module 230 is configured to obtain a target high-frequency amplitude spectrum based on the correlation parameter and the low-frequency amplitude spectrum.

The high-frequency phase spectrum generation module 240 is configured to generate a corresponding high-frequency phase spectrum based on a low-frequency phase spectrum of the narrowband signal.

The high-frequency spectrum determining module 250 is configured to obtain a high-frequency spectrum according to the target high-frequency amplitude spectrum and the high-frequency phase spectrum.

The broadband signal determining module 260 is configured to obtain a broadband signal after BWE based on a low-frequency spectrum and the high-frequency spectrum.

In the solution in this embodiment, the correlation parameter can be obtained based on the parameters of the low-frequency spectrum of the narrowband signal by using the output of the neural network model. Because the prediction is performed by using the neural network model, no additional bits are required for encoding. The solution is a blind analysis method, has relatively good forward compatibility, achieves a spectrum parameter-to-correlation parameter mapping because an output of the model is a parameter that can reflect the correlation between the high-frequency part and the low-frequency part of the target broadband spectrum, and compared with the existing coefficient-to-coefficient mapping manner, has a better generalization capability. Based on the BWE solution in this embodiment of the present disclosure, a signal with a sonorous timbre and a relatively high volume can be obtained, thereby providing a better listening experience for users.

During the obtaining a target high-frequency amplitude spectrum based on the correlation parameter and the low-frequency amplitude spectrum, the high-frequency amplitude spectrum determining module 230 is further configured to:

- obtain a low-frequency spectrum envelope of the narrowband signal according to the low-frequency amplitude spectrum;
- generate an initial high-frequency amplitude spectrum based on the low-frequency amplitude spectrum; and
- adjust the initial high-frequency amplitude spectrum based on the high-frequency spectrum envelope and the low-frequency spectrum envelope, to obtain the target high-frequency amplitude spectrum.

Both the high-frequency spectrum envelope and the low-frequency spectrum envelope are spectrum envelopes in a logarithmic domain, and during the adjusting the initial high-frequency amplitude spectrum based on the high-frequency spectrum envelope and the low-frequency spectrum envelope, to obtain the target high-frequency amplitude spectrum, the high-frequency amplitude spectrum determining module 230 is further configured to:

determine a difference between the high-frequency spectrum envelope and the low-frequency spectrum envelope; and adjust the initial high-frequency amplitude spectrum based on the difference, to obtain the target high-frequency amplitude spectrum.

During the generating an initial high-frequency amplitude spectrum based on the low-frequency amplitude spectrum, the high-frequency amplitude spectrum determining module 230 is further configured to: replicate an amplitude spectrum of a high-frequency band part in the low-frequency amplitude spectrum.

The high-frequency spectrum envelope includes a first quantity of first sub-spectrum envelopes, and the initial high-frequency amplitude spectrum includes the first quantity of amplitude sub-spectra, each of the first quantity of first sub-spectrum envelopes being determined based on a corresponding amplitude sub-spectrum in the initial high-frequency amplitude spectrum.

During the determining a difference between the high-frequency spectrum envelope and the low-frequency spectrum envelope, and adjusting the initial high-frequency amplitude spectrum based on the difference, to obtain the target high-frequency amplitude spectrum, the high-frequency amplitude spectrum determining module 230 is further configured to:

determine a difference between each first sub-spectrum envelope and a corresponding spectrum envelope in the low-frequency spectrum envelope;

adjust a corresponding initial amplitude sub-spectrum based on the difference corresponding to the each first sub-spectrum envelope, to obtain the first quantity of adjusted amplitude sub-spectra; and obtain the target high-frequency amplitude spectrum based on the first quantity of adjusted amplitude sub-spectra.

The correlation parameter further includes relative flatness information, the relative flatness information representing a correlation between a spectrum flatness of the high-frequency part of the target broadband spectrum and a spectrum flatness of the low-frequency part of the target broadband spectrum.

During the determining a difference between the high-frequency spectrum envelope and the low-frequency spectrum envelope, the high-frequency amplitude spectrum determining module 230 is further configured to:

determine a gain adjustment value of the high-frequency spectrum envelope based on the relative flatness information and energy information of the low-frequency spectrum;

adjust the high-frequency spectrum envelope based on the gain adjustment value, to obtain an adjusted high-frequency spectrum envelope; and determine a difference between the adjusted high-frequency spectrum envelope and the low-frequency spectrum envelope.

The relative flatness information includes relative flatness information corresponding to at least two subband regions of the high-frequency part, relative flatness information corresponding to one subband region representing a correlation between a spectrum flatness of the subband region of the high-frequency part and a spectrum flatness of a high-frequency band of the low-frequency part.

During the determining a gain adjustment value of the high-frequency spectrum envelope based on the relative flatness information and energy information of the low-frequency spectrum, the high-frequency amplitude spectrum determining module 230 is further configured to: determine a gain adjustment value of a corresponding spectrum envelope part in the high-frequency spectrum envelope based on relative flatness information corresponding to each subband region and spectrum energy information corresponding to each subband region in the low-frequency spectrum.

During the adjusting the high-frequency spectrum envelope based on the gain adjustment value, the high-frequency amplitude spectrum determining module 230 is further configured to: adjust each corresponding spectrum envelope part according to a gain adjustment value of the corresponding spectrum envelope part in the high-frequency spectrum envelope.

When the high-frequency spectrum envelope includes a first quantity of first sub-spectrum envelopes, during the determining a gain adjustment value of a corresponding spectrum envelope part in the high-frequency spectrum envelope based on relative flatness information corresponding to each subband region and spectrum energy information corresponding to each subband region in the low-frequency spectrum, the high-frequency amplitude spectrum determining module is further configured to:

determine, for each first sub-spectrum envelope, a gain adjustment value of the each first sub-spectrum envelope according to spectrum energy information corresponding to a spectrum envelope, corresponding to the each first sub-spectrum envelope, in the low-frequency spectrum envelope, relative flatness information corresponding to a subband region corresponding to the spectrum envelope, corresponding to the each first sub-spectrum envelope, in the low-frequency spectrum envelope, and spectrum energy information corresponding to the subband region corresponding to the spectrum envelope, corresponding to the each first sub-spectrum envelope, in the low-frequency spectrum envelope.

During the adjusting each corresponding spectrum envelope part according to a gain adjustment value of the corresponding spectrum envelope part in the high-frequency spectrum envelope, the high-frequency amplitude spectrum determining module is further configured to:

adjust each first sub-spectrum envelope according to a gain adjustment value of the corresponding first sub-spectrum envelope in the high-frequency spectrum envelope.

The parameters of the low-frequency spectrum further include the low-frequency spectrum envelope of the narrowband signal.

The apparatus may further include:

a low-frequency amplitude spectrum processing module, configured to: divide the low-frequency amplitude spectrum into a second quantity of amplitude sub-spectra; and respectively determine a sub-spectrum envelope corresponding to each of the second quantity of amplitude sub-spectra, the low-frequency spectrum envelope including the second quantity of determined sub-spectrum envelopes.

During the determining a sub-spectrum envelope corresponding to each of the second quantity of amplitude sub-spectra, the low-frequency amplitude spectrum processing module is further configured to obtain the sub-spectrum envelope corresponding to the each of the second quantity of amplitude sub-spectra based on logarithm values of spectrum coefficients included in the each of the second quantity of amplitude sub-spectra.

When the narrowband signal includes at least two associated signals, the apparatus further includes:

- a narrowband signal determining module, configured to: fuse the at least two associated signals, to obtain the narrowband signal; or respectively use each of the at least two associated signals as the narrowband signal.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The BWE apparatus provided in the embodiments of the present disclosure is an apparatus that can perform the BWE method in the embodiments of the present disclosure. Therefore, based on the BWE method provided in the embodiments of the present disclosure, a person skilled in the art can learn specific implementations of the BWE apparatus in the embodiments of the present disclosure and various variations thereof, and a manner in which the apparatus implements the BWE method in the embodiments of the present disclosure is not described in detail herein. All BWE apparatuses used when a person skilled in the art implements the BWE method in the embodiments of the present disclosure shall fall within the protection scope of the present disclosure.

Based on the same principle of the BWE method and BWE apparatus provided in the embodiments of the present disclosure, an embodiment of the present disclosure further provides an electronic device. The electronic device may include a processor and a memory. The memory stores computer-readable instructions. The computer-readable instructions, when loaded and executed by the processor, may implement the method shown in any embodiment of the present disclosure.

In an example, FIG. 5 is a schematic structural diagram of an electronic device 4000 to which the solution of the embodiments of the present disclosure is applicable. As shown in FIG. 5, the electronic device 4000 may include a processor 4001 and a memory 4003. The processor 4001 and the memory 4003 are connected, for example, are connected by using a bus 4002. The electronic device 4000 may further include a transceiver 4004. In an actual application, there may be one or more transceivers 4004. The structure of the electronic device 4000 does not constitute a limitation on this embodiment of the present disclosure.

The processor 4001 may be a central processing unit (CPU), a general purpose processor, a digital signal processor (DSP), an application-specific integrated circuit (ASIC), a field programmable gate array (FPGA), or another programmable logic device, a transistor logic device, a hardware component, or any combination thereof. The processor may implement or perform various examples of logic blocks, modules, and circuits described with reference to content disclosed in the present disclosure. The processor 4001 may be alternatively a combination to implement a computing function, for example, may be a combination of one or more microprocessors, or a combination of a DSP and a microprocessor.

The bus 4002 may include a channel, to transmit information between the foregoing components. The bus system 4002 may be a peripheral component interconnect (PCI) bus, an extended industry standard architecture (EISA) bus, or the like. The bus 4002 may be classified into an address bus, a data bus, a control bus, and the like. For ease of description, the bus in FIG. 5 is represented by using only one bold line, but it does not indicate that there is only one bus or one type of bus.

The memory 4003 may be a read-only memory (ROM) or a static storage device of another type that can store static information and instructions, a random access memory (RAM) or a dynamic storage device of another type that can store information and instructions, or an electrically erasable programmable read-only memory (EEPROM), a compact disc read-only memory (CD-ROM) or other optical disk storage, optical disc storage (including a compact disc, a laser disc, an optical disc, a digital versatile disc, a Blu-ray disc, or the like), a disk storage medium or another magnetic storage device, or any other medium that can be used to carry or store expected program code in a command or data structure form and that can be accessed by a computer, but is not limited thereto.

The memory 4003 is configured to store application program code for performing the solutions of the present disclosure, and is controlled and executed by the processor 4001. The processor 4001 is configured to execute application program code stored in the memory 4003 to implement the solution shown in any one of the foregoing method embodiments.

An embodiment of the present disclosure further provides a computer program product or a computer program. The computer program product or the computer program includes computer instructions, and the computer instructions are stored in a computer-readable storage medium. A processor of an electronic device reads the computer instructions from the computer-readable storage medium and executes the computer instructions to cause the electronic device to perform the foregoing BWE method.

In the BWE solution provided in the embodiments of the present disclosure, a correlation parameter can be obtained based on parameters of a low-frequency spectrum of a narrowband signal by using an output of a neural network model. Because the prediction is performed by using the neural network model, no additional bits are required for encoding. The solution is a blind analysis method, has relatively good forward compatibility, achieves a spectrum parameter-to-correlation parameter mapping because an output of the model is a parameter that can reflect the correlation between the high-frequency part and the low-frequency part of the target broadband spectrum, and compared with the existing coefficient-to-coefficient mapping manner, has a better generalization capability. Based on the BWE solution in the embodiments of the present disclosure, a signal with a sonorous timbre and a relatively high volume can be obtained, thereby providing a better listening experience for users.

It is to be understood that, although the steps in the flowcharts in the accompanying drawings are sequentially shown according to indication of an arrow, the steps are not necessarily sequentially performed according to a sequence indicated by the arrow. Unless explicitly specified in this specification, execution of the steps is not strictly limited in the sequence, and the steps may be performed in other sequences. In addition, at least some steps in the flowcharts in the accompanying drawings may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

The foregoing descriptions are some implementations of the present disclosure. A person of ordinary skill in the art may make several improvements and refinements without departing from the principle of the present disclosure, and the improvements and refinements shall fall within the protection scope of the present disclosure.

What is claimed is:

1. A bandwidth extension (BWE) method, performed by an electronic device, the method comprising:

determining parameters of a low-frequency spectrum of a narrowband signal, the parameters of the low-frequency spectrum comprising a low-frequency amplitude spectrum;

inputting the parameters of the low-frequency spectrum into a neural network model, and obtaining a correlation parameter based on an output of the neural network model, the correlation parameter representing a correlation between a high-frequency part and a low-frequency part of a target broadband spectrum and comprising a high-frequency spectrum envelope;

obtaining a low-frequency spectrum envelope of the narrowband signal according to the low-frequency amplitude spectrum;

generating an initial high-frequency amplitude spectrum based on the low-frequency amplitude spectrum;

adjusting the initial high-frequency amplitude spectrum based on the high-frequency spectrum envelope and the low-frequency spectrum envelope, to obtain a target high-frequency amplitude spectrum;

generating a corresponding high-frequency phase spectrum based on a low-frequency phase spectrum of the narrowband signal;

obtaining a high-frequency spectrum according to the target high-frequency amplitude spectrum and the high-frequency phase spectrum; and obtaining a broadband signal after BWE based on the low-frequency spectrum and the high-frequency spectrum.

2. The method according to claim 1, wherein both the high-frequency spectrum envelope and the low-frequency spectrum envelope are spectrum envelopes in a logarithmic domain, and the adjusting the initial high-frequency amplitude spectrum based on the high-frequency spectrum envelope and the low-frequency spectrum envelope, to obtain the target high-frequency amplitude spectrum comprises:

determining a difference between the high-frequency spectrum envelope and the low-frequency spectrum envelope; and adjusting the initial high-frequency amplitude spectrum based on the difference, to obtain the target high-frequency amplitude spectrum.

3. The method according to claim 1, wherein the generating an initial high-frequency amplitude spectrum based on the low-frequency amplitude spectrum comprises:

replicating an amplitude spectrum of a high-frequency band part in the low-frequency amplitude spectrum.

4. The method according to claim 2, wherein the high-frequency spectrum envelope comprises a first quantity of first sub-spectrum envelopes, and the initial high-frequency amplitude spectrum comprises the first quantity of amplitude sub-spectra, each of the first quantity of first sub-spectrum envelopes being determined based on a corresponding amplitude sub-spectrum in the initial high-frequency amplitude spectrum; and the determining a difference between the high-frequency spectrum envelope and the low-frequency spectrum envelope, and adjusting the initial high-frequency amplitude spectrum based on the difference, to obtain the target high-frequency amplitude spectrum comprises:

determining a difference between each first sub-spectrum envelope and a corresponding spectrum envelope in the low-frequency spectrum envelope;

adjusting a corresponding initial amplitude sub-spectrum based on the difference corresponding to the each first sub-spectrum envelope, to obtain the first quantity of adjusted amplitude sub-spectra; and obtaining the target high-frequency amplitude spectrum based on the first quantity of adjusted amplitude sub-spectra.

5. The method according to claim 2, wherein the correlation parameter further comprises relative flatness information, the relative flatness information representing a correlation between a spectrum flatness of the high-frequency part of the target broadband spectrum and a spectrum flatness of the low-frequency part of the target broadband spectrum; and the determining a difference between the high-frequency spectrum envelope and the low-frequency spectrum envelope comprises:

determining a gain adjustment value of the high-frequency spectrum envelope based on the relative flatness information and energy information of the low-frequency spectrum;

adjusting the high-frequency spectrum envelope based on the gain adjustment value, to obtain an adjusted high-frequency spectrum envelope; and determining a difference between the adjusted high-frequency spectrum envelope and the low-frequency spectrum envelope.

6. The method according to claim 5, wherein the relative flatness information comprises relative flatness information corresponding to at least two subband regions of the high-frequency part, relative flatness information corresponding to one subband region representing a correlation between a spectrum flatness of the subband region of the high-frequency part and a spectrum flatness of a high-frequency band of the low-frequency part;

the determining a gain adjustment value of the high-frequency spectrum envelope based on the relative flatness information and energy information of the low-frequency spectrum comprises:

determining a gain adjustment value of a corresponding spectrum envelope part in the high-frequency spectrum envelope based on relative flatness information corresponding to each subband region and spectrum energy information corresponding to each subband region in the low-frequency spectrum; and the adjusting the high-frequency spectrum envelope based on the gain adjustment value comprises:

adjusting each corresponding spectrum envelope part based on a gain adjustment value of the corresponding spectrum envelope part in the high-frequency spectrum envelope.

7. The method according to claim 6, wherein when the high-frequency spectrum envelope comprises a first quantity of first sub-spectrum envelopes, the determining a gain adjustment value of a corresponding spectrum envelope part in the high-frequency spectrum envelope based on relative flatness information corresponding to each subband region and spectrum energy information corresponding to each subband region in the low-frequency spectrum comprises:

determining, for each first sub-spectrum envelope, a gain adjustment value of the each first sub-spectrum envelope according to spectrum energy information corresponding to a spectrum envelope, corresponding to the each first sub-spectrum envelope, in the low-frequency spectrum envelope, relative flatness information corresponding to a corresponding subband region, and spectrum energy information corresponding to the corresponding subband region; and the adjusting each corresponding spectrum envelope part based on a gain adjustment value of the corresponding spectrum envelope part in the high-frequency spectrum envelope comprises:

adjusting each first sub-spectrum envelope according to a gain adjustment value of the corresponding first sub-spectrum envelope in the high-frequency spectrum envelope.

8. The method according to claim 1, wherein the parameters of the low-frequency spectrum further comprise the low-frequency spectrum envelope of the narrowband signal.

9. The method according to claim 8, further comprising:

dividing the low-frequency amplitude spectrum into a second quantity of amplitude sub-spectra; and respectively determining a sub-spectrum envelope corresponding to each of the second quantity of amplitude sub-spectra, the low-frequency spectrum envelope comprising the second quantity of determined sub-spectrum envelopes.

10. The method according to claim 9, wherein the determining a sub-spectrum envelope corresponding to each of the second quantity of amplitude sub-spectra comprises:

obtaining the sub-spectrum envelope corresponding to the each of the second quantity of amplitude sub-spectra based on logarithm values of spectrum coefficients comprised in the each of the second quantity of amplitude sub-spectra.

11. The method according to claim 1, wherein when the narrowband signal comprises at least two associated signals, the method further comprises:

fusing the at least two associated signals, to obtain the narrowband signal.

12. The method according to claim 1, wherein when the narrowband signal comprises at least two associated signals, the method further comprises:

respectively using each of the at least two associated signals as the narrowband signal.

13. A bandwidth extension (BWE) apparatus, comprising a processor and a memory, the memory storing computer-readable instructions executable by the processor, the processor being configured to:

determine parameters of a low-frequency spectrum of a narrowband signal, the parameters of the low-frequency spectrum comprising a low-frequency amplitude spectrum;

input the parameters of the low-frequency spectrum into a neural network model, and obtain a correlation parameter based on an output of the neural network model, the correlation parameter representing a correlation between a high-frequency part and a low-frequency part of a target broadband spectrum and comprising a high-frequency spectrum envelope;

obtain a low-frequency spectrum envelope of the narrowband signal according to the low-frequency amplitude spectrum;

generate an initial high-frequency amplitude spectrum based on the low-frequency amplitude spectrum;

adjust the initial high-frequency amplitude spectrum based on the high-frequency spectrum envelope and the low-frequency spectrum envelope, to obtain a target high-frequency amplitude spectrum;

generate a corresponding high-frequency phase spectrum based on a low-frequency phase spectrum of the narrowband signal;

obtain a high-frequency spectrum according to the target high-frequency amplitude spectrum and the high-frequency phase spectrum; and obtain a broadband signal after BWE based on the low-frequency spectrum and the high-frequency spectrum.

14. The apparatus according to claim 13, wherein the processor is further configured to:

determine a difference between the high-frequency spectrum envelope and the low-frequency spectrum envelope; and adjust the initial high-frequency amplitude spectrum based on the difference, to obtain the target high-frequency amplitude spectrum.

15. The apparatus according to claim 13, wherein the processor is further configured to:

replicate an amplitude spectrum of a high-frequency band part in the low-frequency amplitude spectrum.

16. The apparatus according to claim 14, wherein the processor is further configured to:

determine a difference between each first sub-spectrum envelope and a corresponding spectrum envelope in the low-frequency spectrum envelope;

adjust a corresponding initial amplitude sub-spectrum based on the difference corresponding to the each first sub-spectrum envelope, to obtain the first quantity of adjusted amplitude sub-spectra; and obtain the target high-frequency amplitude spectrum based on the first quantity of adjusted amplitude sub-spectra.

17. The apparatus according to claim 14, wherein the correlation parameter further comprises relative flatness information, the relative flatness information representing a correlation between a spectrum flatness of the high-frequency part of the target broadband spectrum and a spectrum flatness of the low-frequency part of the target broadband spectrum; and the processor is further configured to:

adjust the high-frequency spectrum envelope based on the gain adjustment value, to obtain an adjusted high-frequency spectrum envelope; and determine a difference between the adjusted high-frequency spectrum envelope and the low-frequency spectrum envelope.

18. A non-transitory computer-readable storage medium, storing computer-readable instructions, the computer-readable instructions, when loaded and executed by a processor, causing the processor to perform:

determining parameters of a low-frequency spectrum of a narrowband signal, the parameters of the low-frequency spectrum comprising a low-frequency amplitude spectrum;

inputting the parameters of the low-frequency spectrum into a neural network model, and obtaining a correlation parameter based on an output of the neural network model, the correlation parameter representing a correlation between a high-frequency part and a low-frequency part of a target broadband spectrum and comprising a high-frequency spectrum envelope;

obtaining a low-frequency spectrum envelope of the narrowband signal according to the low-frequency amplitude spectrum;

generating an initial high-frequency amplitude spectrum based on the low-frequency amplitude spectrum;

adjusting the initial high-frequency amplitude spectrum based on the high-frequency spectrum envelope and the low-frequency spectrum envelope, to obtain a target high-frequency amplitude spectrum;

generating a corresponding high-frequency phase spectrum based on a low-frequency phase spectrum of the narrowband signal;

obtaining a high-frequency spectrum according to the target high-frequency amplitude spectrum and the high-frequency phase spectrum; and obtaining a broadband signal after BWE based on the low-frequency spectrum and the high-frequency spectrum.

* * * * *